United States Patent [19]

Higashio et al.

[11] Patent Number: 5,325,152
[45] Date of Patent: Jun. 28, 1994

[54] IMAGE FORMING APPARATUS HAVING DETACHABLE IC CARD

[75] Inventors: Kimihiko Higashio; Masazumi Ito, both of Osaka, Japan

[73] Assignee: Minolta Camera Kabushiki Kaisha, Osaka, Japan

[21] Appl. No.: 544,240

[22] Filed: Jun. 26, 1990

[30] Foreign Application Priority Data

| Jun. 28, 1989 | [JP] | Japan | 1-165666 |
| Aug. 18, 1989 | [JP] | Japan | 1-213774 |
| Aug. 18, 1989 | [JP] | Japan | 1-213775 |
| Aug. 18, 1989 | [JP] | Japan | 1-213776 |
| Aug. 18, 1989 | [JP] | Japan | 1-213777 |
| Aug. 18, 1989 | [JP] | Japan | 1-213778 |
| Aug. 21, 1989 | [JP] | Japan | 1-214437 |
| Aug. 22, 1989 | [JP] | Japan | 1-215310 |
| Aug. 22, 1989 | [JP] | Japan | 1-215311 |
| Aug. 22, 1989 | [JP] | Japan | 1-215312 |

[51] Int. Cl.$^5$ .............................. G03G 21/00
[52] U.S. Cl. .................. 355/202; 355/209; 355/308
[58] Field of Search ............... 355/200, 202, 209, 308, 355/309, 313, 314, 203, 204, 208, 243

[56] References Cited

U.S. PATENT DOCUMENTS

| 4,579,443 | 4/1986 | Abuyama et al. | 355/314 X |
| 4,699,501 | 10/1987 | Watanabe et al. | 355/200 |
| 4,821,107 | 4/1989 | Naito et al. | 355/209 |
| 4,882,604 | 11/1989 | Kato et al. | 355/202 X |
| 4,933,725 | 6/1990 | Ito | 355/309 |
| 4,990,954 | 2/1991 | Higashio et al. | 355/200 |
| 4,992,827 | 2/1991 | Kobayashi et al. | 355/202 |

*Primary Examiner*—A. T. Grimley
*Assistant Examiner*—Robert Beatty
*Attorney, Agent, or Firm*—Burns, Doane, Swecker & Mathis

[57] ABSTRACT

An image forming apparatus includes a main body having an image forming portion and a first indicating device for indicating an accumulated number of copies the image forming portion, and an IC card detachable from the main body. The IC card includes a second indicating device for indicating the accumulated number of copies when the IC card is attached. The IC card further includes an arithmetic operation key for inputting a numerical calculation expression. A numerical calculation will be carried out in accordance with the arithmetic operation key. Finally, the IC card will have first and second states and the image forming apparatus will be switched between operable and inoperable conditions depending on the first and second states

23 Claims, 32 Drawing Sheets

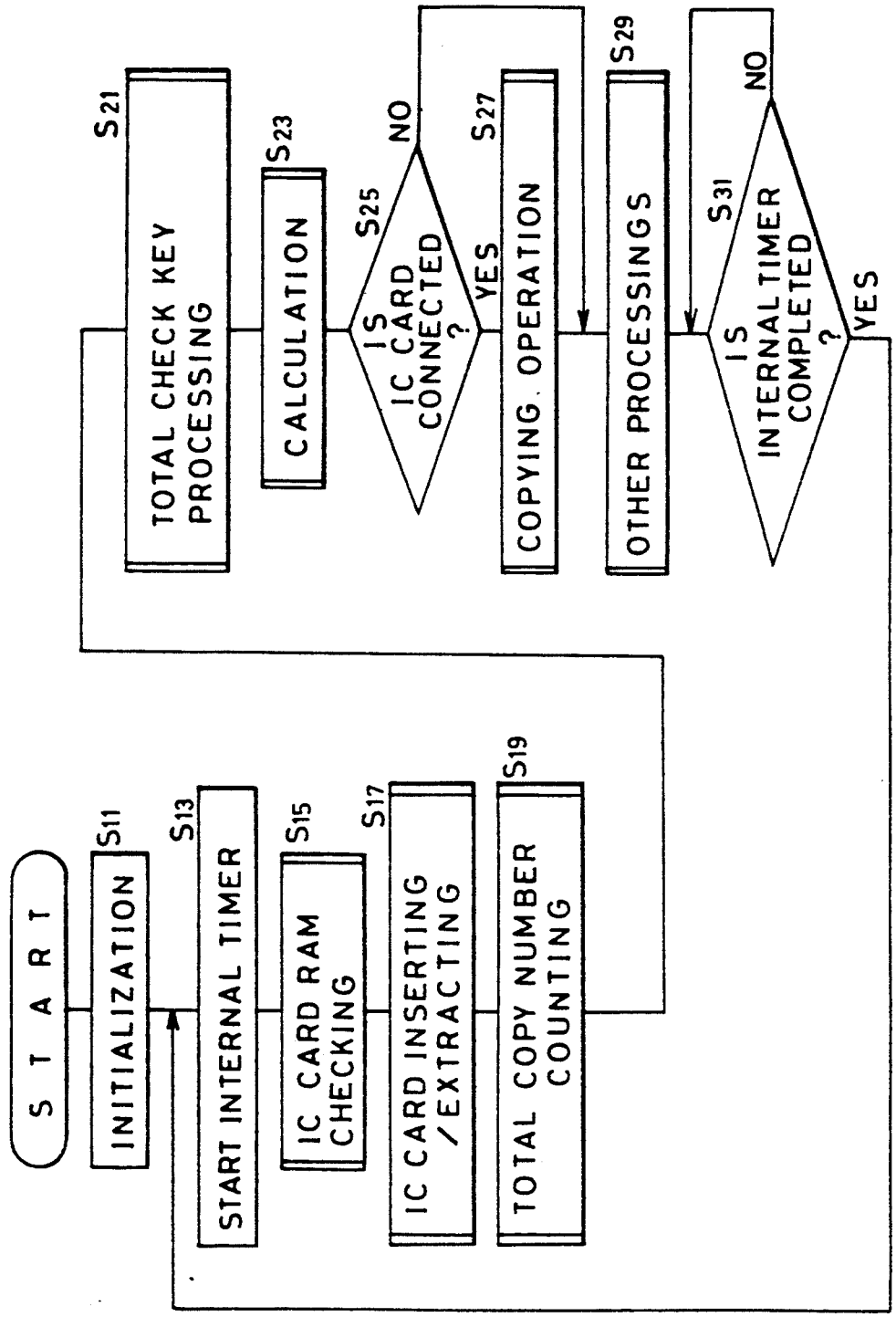

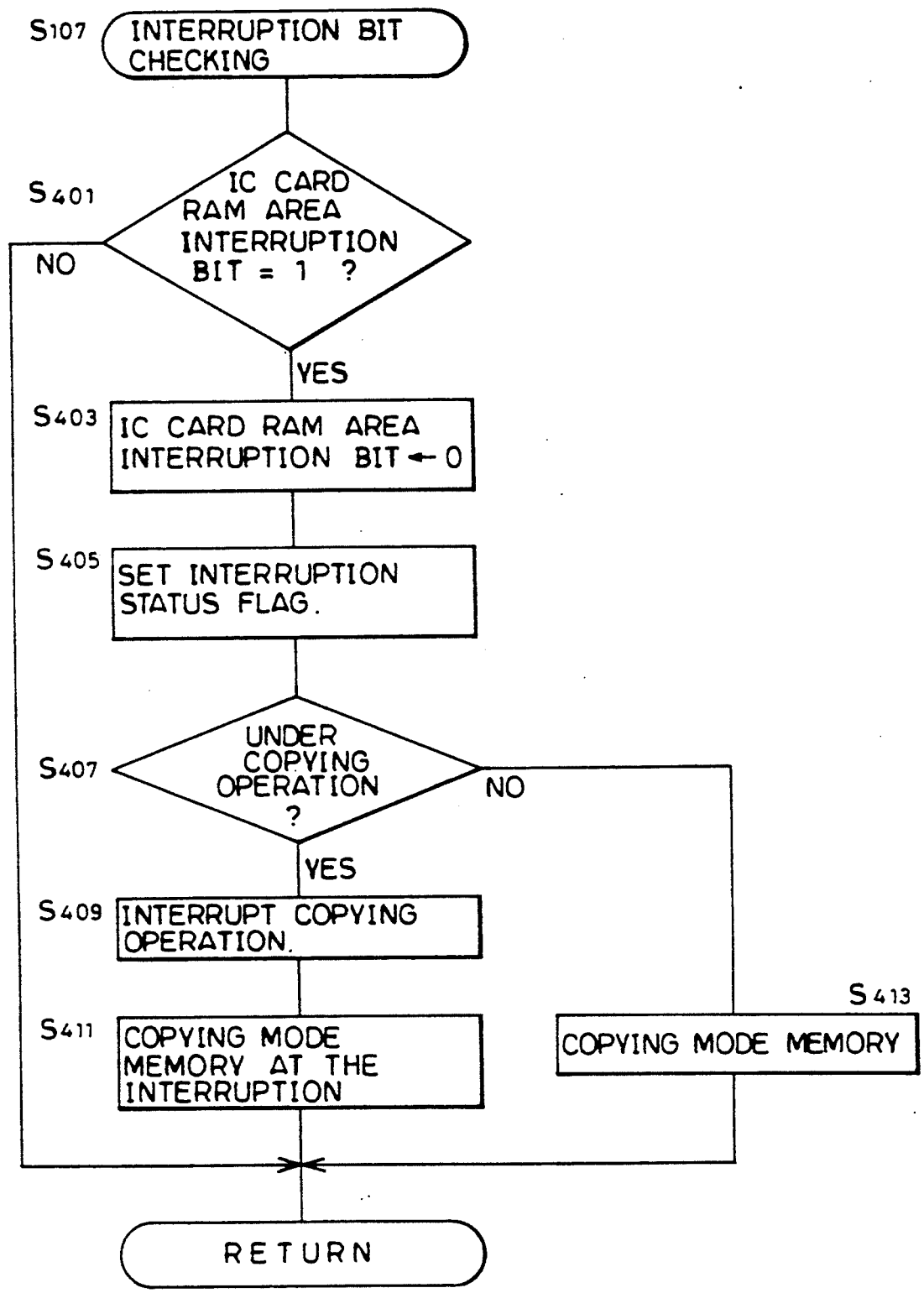

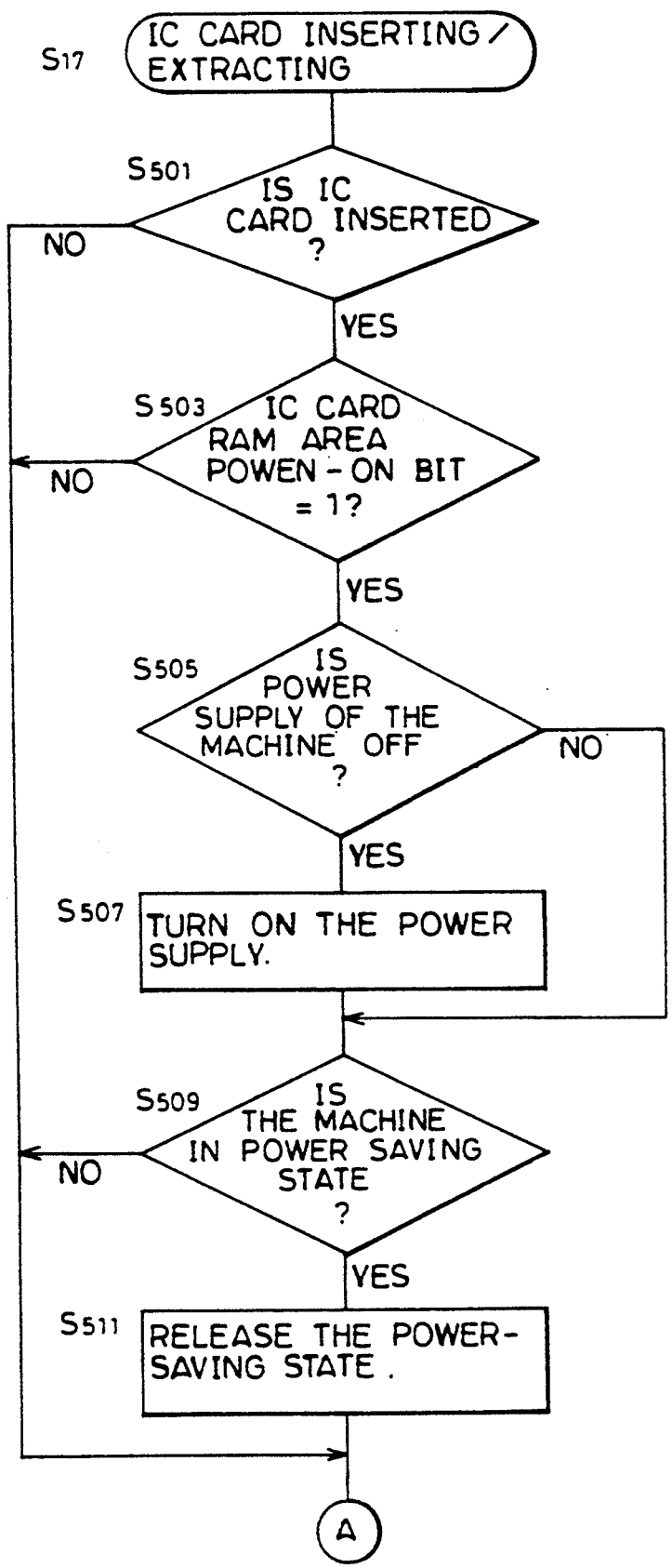

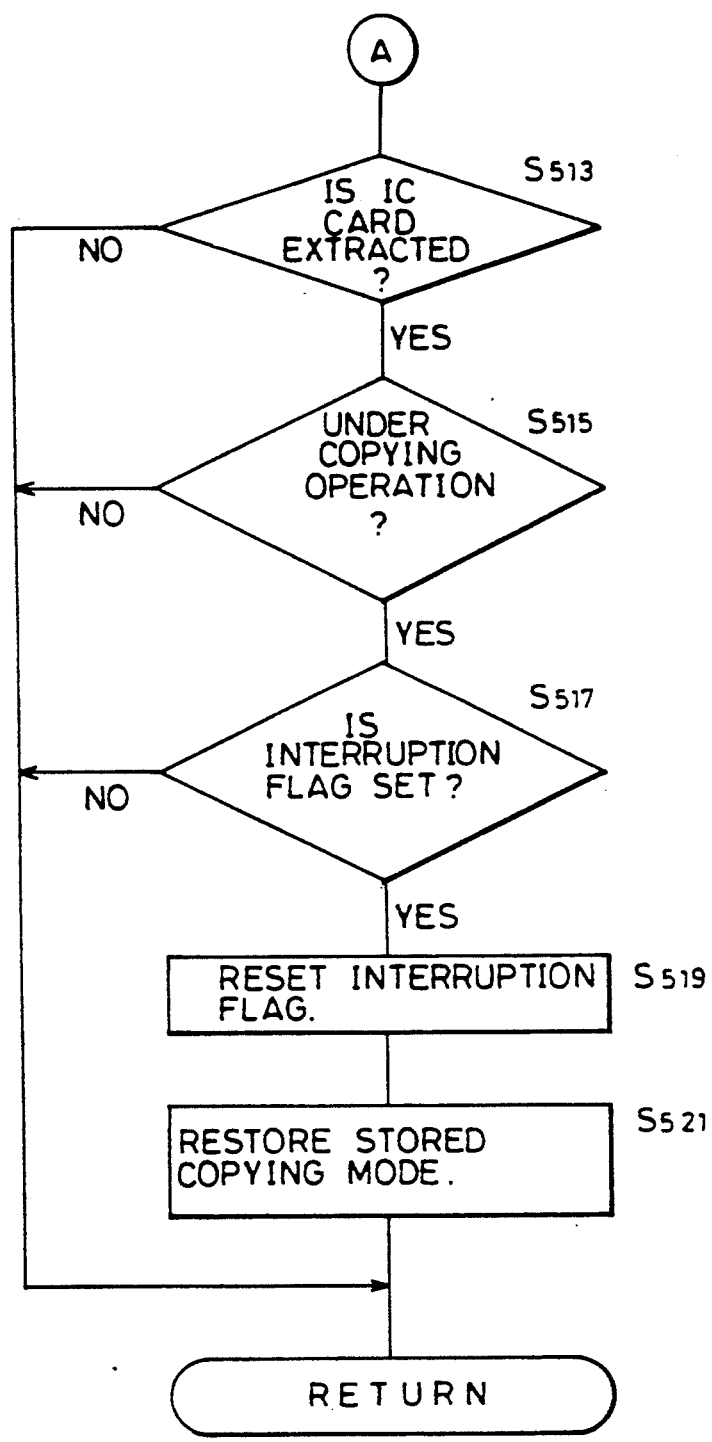

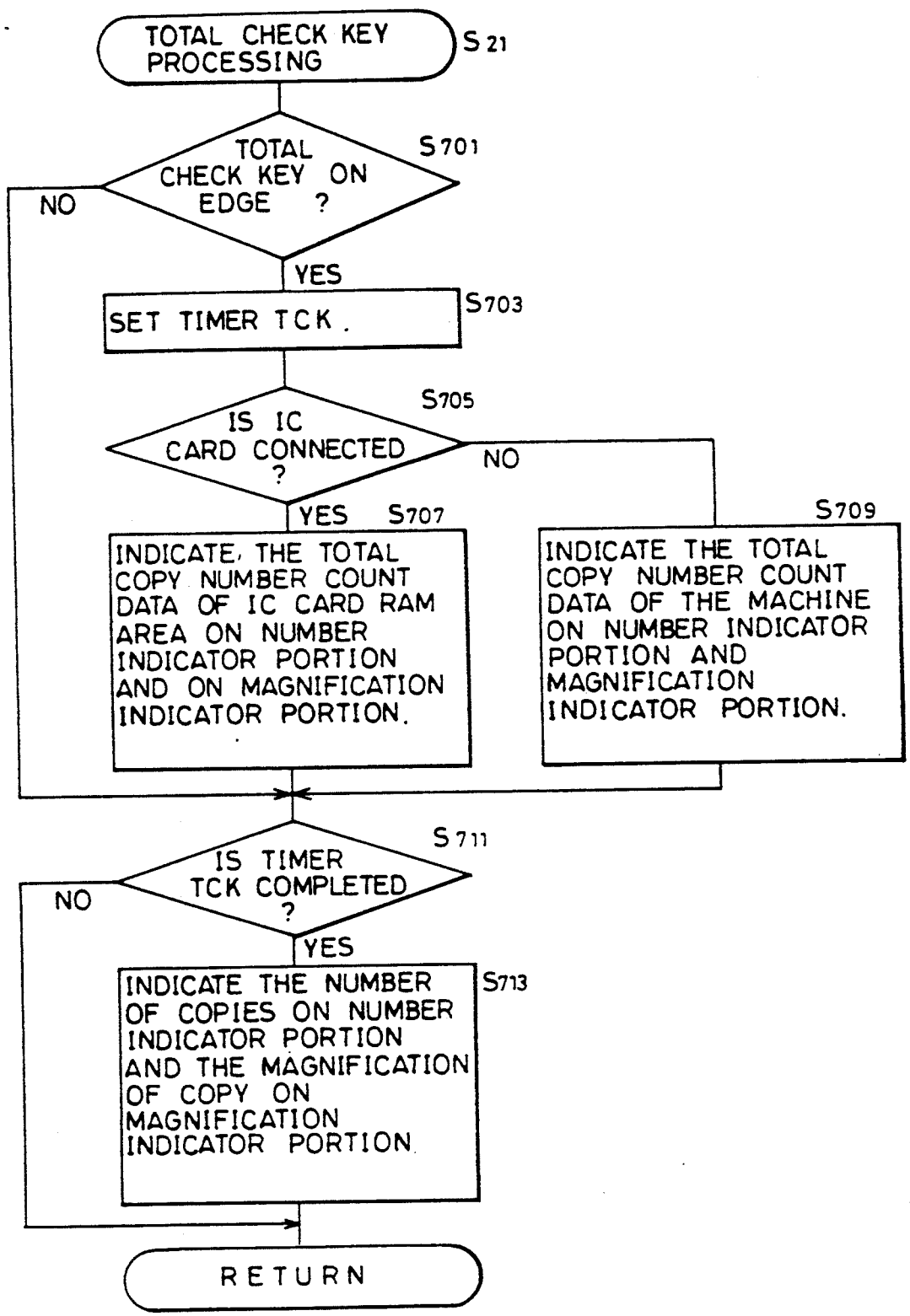

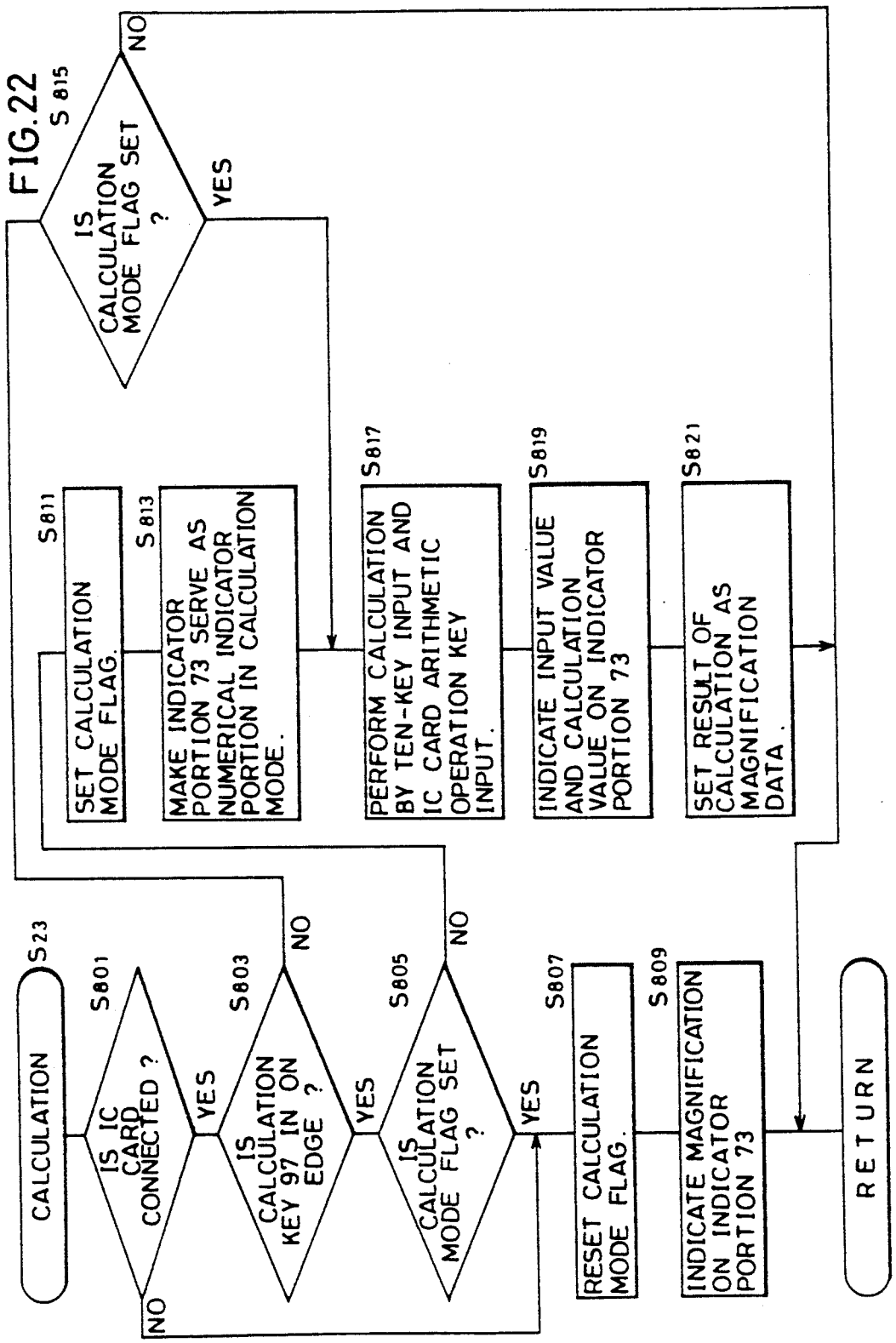

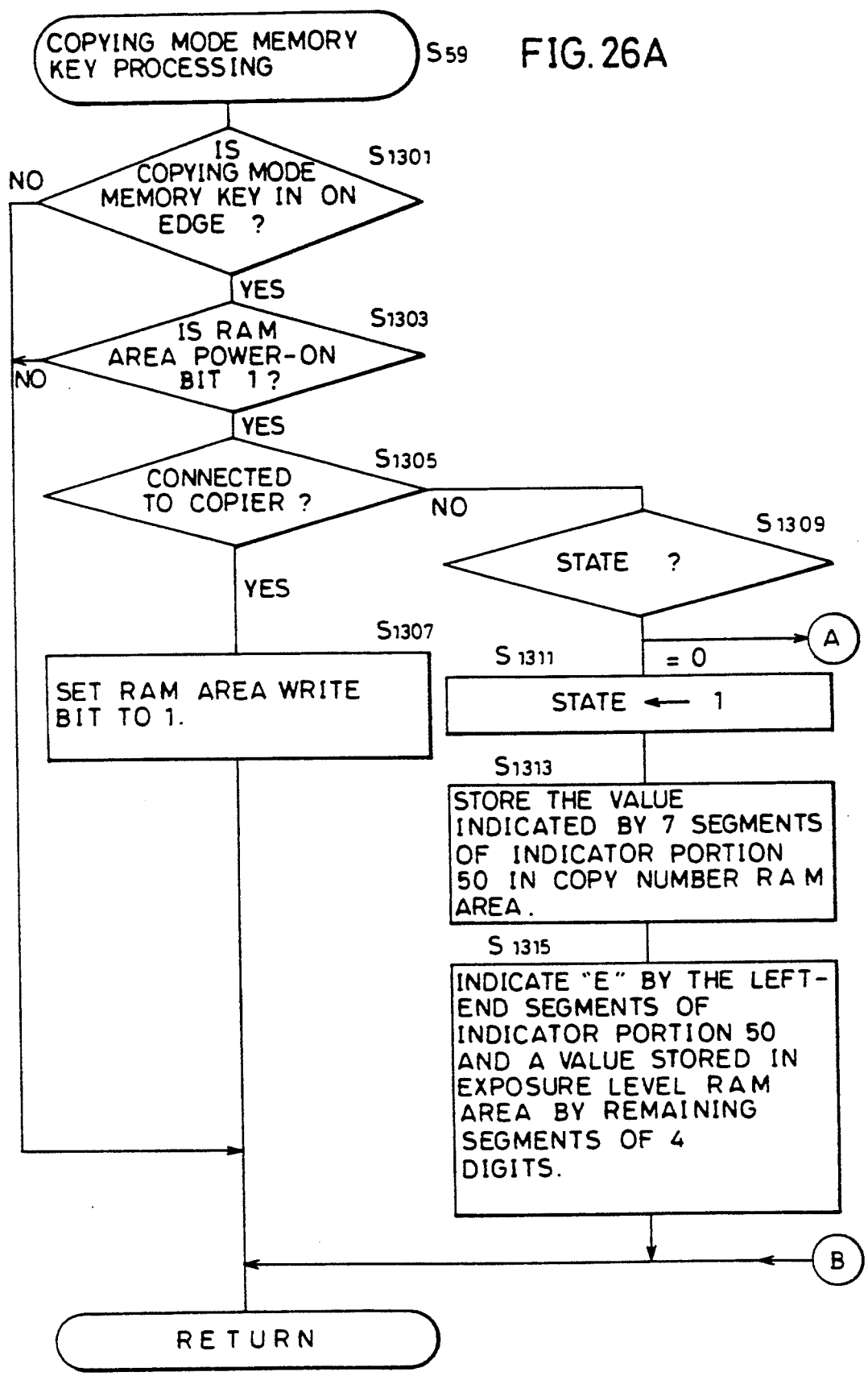

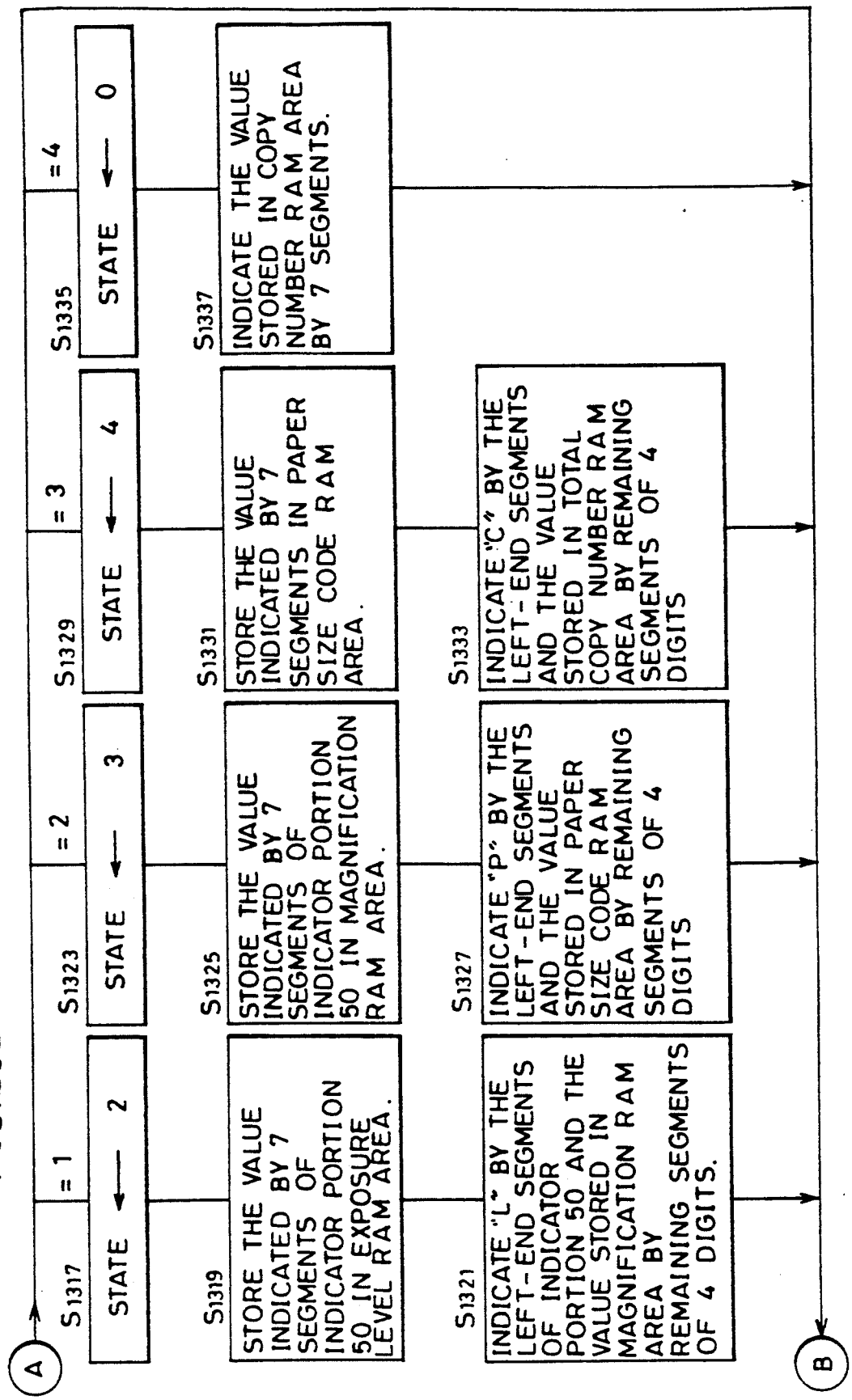

IMAGE FORMING APPARATUS HAVING DETACHABLE IC CARD

BACKGROUND OF THE INVENTION

1. Field of the Invention

The present invention relates generally to image forming apparatuses, and more particularly to an image forming apparatus having a detachable storage medium device such as an IC card.

2. Description of the Related Art

Such a system has been proposed that a storage medium such as an IC card in which a copying mode of a copying apparatus (copying magnification, exposure, the number of copies, copy paper size, etc.) is previously registered as data is connected to the copying apparatus so as to set all of the copying mode of the registered data together in the copying apparatus.

In this system, a dedicated data input device such as an input device for edition has been conventionally employed for registering copying mode data in the IC card.

In case where an operator temporarily uses the copying apparatus which is being occupied by another operator,. it is considered adequate to immediately set a second copying. mode by connecting the IC card to the apparatus, and after the connection is released, return to a first copying mode according to the above described copying system.

In this case, an interruption mode must be set before setting the copying mode registered in the IC card by operating a set key or the like provided in the copying apparatus. The interruption mode serves to save data of a copying mode currently set (hereinafter referred to as "the first copying mode") to set another copying mode (hereinafter referred to as "the second copying mode"), and after the second copying mode is released, restore the first copying mode.

In the meanwhile, there is a demand that the registration of copying mode data into the IC card should be carried out without a special data input device required. The IC card includes a group of four-arithmetical operation keys ($\times$, $\div$, $+$, $-$, $=$) to be able to function as a calculator as well.

Furthermore, there is another demand that arithmetical operation of copying magnification or the like should be performed by providing the four-arithmetical operation keys in the copying apparatus. However, taking into consideration that the operation panel of the copying apparatus has no spare area-and that an increase in the number of keys is disadvantageous in cost, such a proposal has been made for the foregoing demands as to provide, for example, the four-arithmetical operation keys as a variable key (which performs different functions from the normal function when operated after the operation of a predetermined function key).

In this case, this variable key requires time to be operated and is less frequently used, so that the operator can not get used to operation of the key and hence becomes liable to cause operation errors and the like.

In the meanwhile, the IC card includes a power source ON/OFF key and indication means, by which a copying mode registered in the card is indicated when the power source is turned on. In addition, while the IC card is normally powered by built-in batteries, it is also powered and even charged by a power source of the copying apparatus when connected to the copying apparatus.

In case of connecting the IC card to the copying apparatus to set the copying mode registered in the card, the copying apparatus is to be in an operating state (in which the power source is ON and a copying operation is available).

To this end, conventionally, the power source of the copying apparatus is turned on in order to put the copying apparatus in a standby state before connected with the IC card.

That is to say, dual operations are required that the turning on of the power source of the copying apparatus and the connection of the IC card, causing a demand that these operations should be performed in a single operation.

As described above, the IC card is to be charged from the power source of the copying apparatus while being connected with the copying apparatus.

Therefore, such a case also occurs that only the charging of the above described IC card is required without the setting of copying mode in the copying apparatus.

In the meanwhile, a copying apparatus is proposed which includes two numeric value indicating means: copy number indicator means for indicating the set number of copies, namely, how many copies of one original is to be made (normally in two digits) and magnification indicator means for indicating a copying magnification set (normally in four digits).

As numeric values to be indicated in the copier, the accumulating total number of copies, for example, is provided other than the number of copies and the copying magnification. This is used for the aim of maintenance period or the basis of a charge (rate) calculation.

However, it is less effective to provide independent indicator means for indicating only the accumulating total number of copies due to limitation in the area of an indicator panel or an increase in cost.

Thus, such a system is proposed, for example, as to locate the above describe two numeric value indicator means in close positions on the panel, constituting a numeric value indicator portion of six digits by employing these means simultaneously in a particular mode so as to indicate the accumulating total number of copies.

However, this system fails to indicate the number of copies or the copying magnification which is to be indicated intrinsically while indicating the accumulating total number of copies.

The indication of the accumulating total number of copies is carried out in general when instructed by input means such as an accumulating total number indication instructing key or the like.

A request has been made that the accumulating total number of image forming processes carried out by employing storage medium means such as the IC card or the like should be informed. Since the IC card is prepared in general for each individual person or for each section in a company, it is necessary to know the frequency of use of a copying apparatus per each individual person or each section and to acquire base data of calculation of charges (rates) for each person or each section according to the accumulating total number of copies processed for each IC card.

Conventionally, the data of the accumulating total number of Copies processed for each IC card is indicated on the indication panel of the above described dedicated data input device by connecting the IC card to the data input device and operating predetermined keying means such as the accumulating total number indication instructing key qr the like. It is a very ineffective method, however, that the IC card is connected to the dedicated data input device in order to merely indicate the above described accumulating total number data.

As described in the foregoing, a special data input device such as an input device for edition has conventionally been employed in registration, on of copying mode data. Further, the registration of copying mode data is carried out while checking data to be inputted on the indication panel of the data input device.

There is another request that registered data of the IC card should easily be checked. This request is made, for example, when the copying mode registered in the IC card is to be checked prior to setting the copying mode in the copying apparatus. That is to say, this checking has been considerably difficult because it has not been achieved until the indication of data was instructed after setting the IC card in the data input device.

There is still another request that the registration of copying mode data into the IC card should be easily carried out without employing the data input device.

Moreover, a card-type calculator or the like for executing a predetermined arithmetic operation based on an instruction externally provided corresponds to the above described storage device such as the IC card.

There is a case where data held by the IC card is to be checked by an indication or the like before the data is loaded into the copying apparatus. Further, there is another case where upon indicating data of the IC card or the card-type calculator (registered data, data indicating the result of arithmetic operation, etc.), the content of the indication is to be shown to other persons facing to the operator.

In the foregoing description, the transfer of data from the IC card to the copying apparatus and the setting of the copying mode defined by the transferred data are performed by operating an IC card key of the copying apparatus after connecting the IC card and the copying apparatus.

The IC card key is in general an optional operation key provided in the copier, which serves to instruct the data transfer from the IC card and the setting of the copying mode defined by the transferred data.

The setting of a copying mode in the copying apparatus in accordance with the registered data of the IC card is performed by the operation of the IC card key of the copying apparatus, as described above.

Therefore, the IC card key is unrequited for the user who does not utilize the IC card, and is thus optionally provided in general.

It is not during manufacture of the operation panel but usually after shipment from the factory when the key is added optionally. Therefore, an exchange of a sheet (on which the location of switches is printed) is carried out mostly by service men. However, the service men are not used to the sheet exchange and thus are liable to make mistakes.

In addition, if keys which are less frequently used such as the above described IC card key are also provided on the operation panel of the copying apparatus, along with keys which are closely relating to the copying operation and frequently operated for usage of the copying apparatus (e.g., a copying start key, a ten-key for inputting numeric values, etc.), it becomes difficult to operate or the keys which are to be frequency operated.

There is a demand that data registration should be carried out with respect to the above described IC card (for loading a copying mode into the copying apparatus) without employing a data input device.

In the meanwhile, there is provided a card-type calculator having four-arithmetic operation keys, a numeric value data input key, an indication panel, etc. In this connection, there is a further demand that the IC card should be employed for other applications than the copying mode data registration in consideration for the capacity of and processing capabilities of chips used in the IC card.

SUMMARY OF THE INVENTION

It is an object of the present invention to improve usage of an image forming apparatus having a detachable IC card.

It is another object of the present invention to enable a simple operation in an image forming apparatus having a detachable IC card.

It is a further object of the present invention to improve usage of operation keys in an image forming apparatus having a detachable IC card.

It is a still further object of the present invention to simplify, in an image forming apparatus having a detachable IC card, an operation caused by attachment of the IC card to the apparatus.

It is a still further object of the present invention to facilitate, in an image forming apparatus having a detachable IC card, a checking of indicated processing information in attachment of the IC card to the apparatus.

It is still another object of the present invention to make it unnecessary, in an image forming apparatus having a detachable IC card, to provide a dedicated data inputting device for inputting data to the IC card.

It is a still further object of the present invention to easily check, in an image forming apparatus having a detachable IC card, registered contents of the IC card without employing a data inputting device.

It is a still further object of the present invention to make it unnecessary to provide an IC card key in an image forming apparatus having a detachable IC card.

It is a still further object of the present invention to widen, in an image forming apparatus having a detachable IC card, the application of the IC card.

To accomplish the foregoing objects, an image forming apparatus according to one aspect of the present invention includes a main body having image forming means and first storage means for storing the operation mode of the image forming means, and storage medium means detachable with respect to the main body. The storage medium means includes second storage means for storing data associated with the operation mode, key means for setting the storage medium means to operate in an interruption designating state, and means responsive to keying by the key means for setting the storage medium means to operate in the interruption designating state. The image forming apparatus further includes control means for setting the operation mode of the image forming apparatus based on data stored in the second storage means, with the storage medium means being attached to the main body, and for setting the operation mode based on data after storing in the first storage means the operation mode already set in the image forming apparatus prior to the setting of the operation mode based on the data, when the storage medium means is set to operate in the interruption designating state.

When the storage medium means is attached to the image forming apparatus structured in the above described manner, the apparatus is set to operate in the operation mode stored in the storage medium means after storing the operation mode set before the storage medium means is attached thereto. Therefore, the usage of the image forming apparatus is enhanced.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a flow chart showing the processing of a main routine of a control CPU 201 of FIG. 5;

FIG. 17 is a flow chart showing the detailed contents of an interruption bit checking of FIG. 14;

FIGS. 18A and 18B are flow charts showing the detailed contents of an IC card inserting/extracting processing of FIG. 13;

FIG. 20 is a flow chart showing one example of the detailed contents of a total check key processing of FIG. 13;

FIG. 22 is a flow chart showing the detailed contents of a calculation of FIG. 13;

FIGS. 26A and 26B flow charts showing the detailed contents of a copying mode memory key processing of FIG. 23;

DESCRIPTION OF THE PREFERRED EMBODIMENTS

The embodiment of the system according to the present invention will be described in the following order:
1. IC Card
2. Copying Apparatus
3. Connection of IC Card and Copying Apparatus
4. Processings in CPU of Copying Apparatus
5. Processings in CPU of IC Card

1. IC Card

Figure 1:
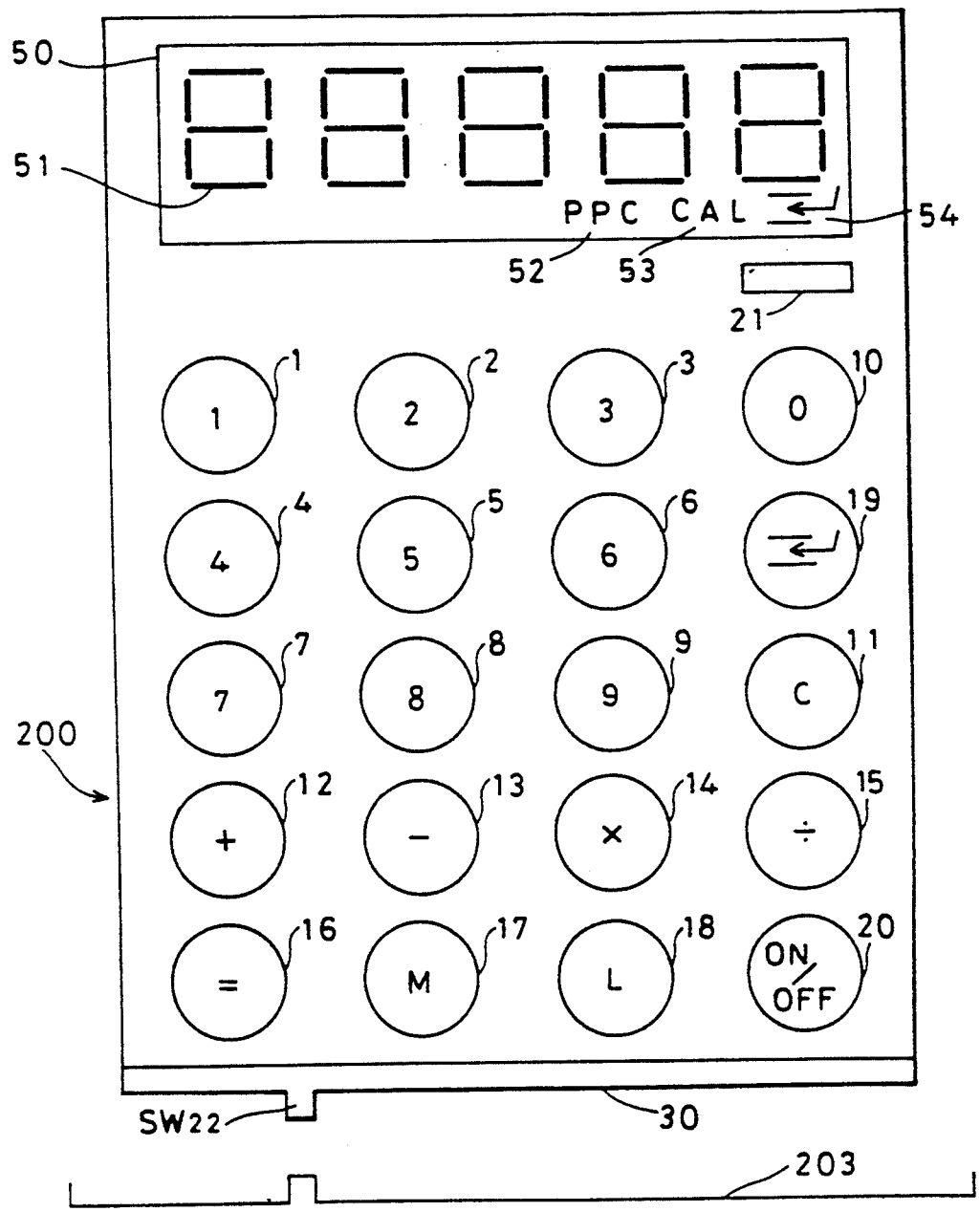
FIG. 1 is a descriptive diagram showing an operation surface of an IC card employed in a system according to one embodiment of the present invention.
Figure 2:
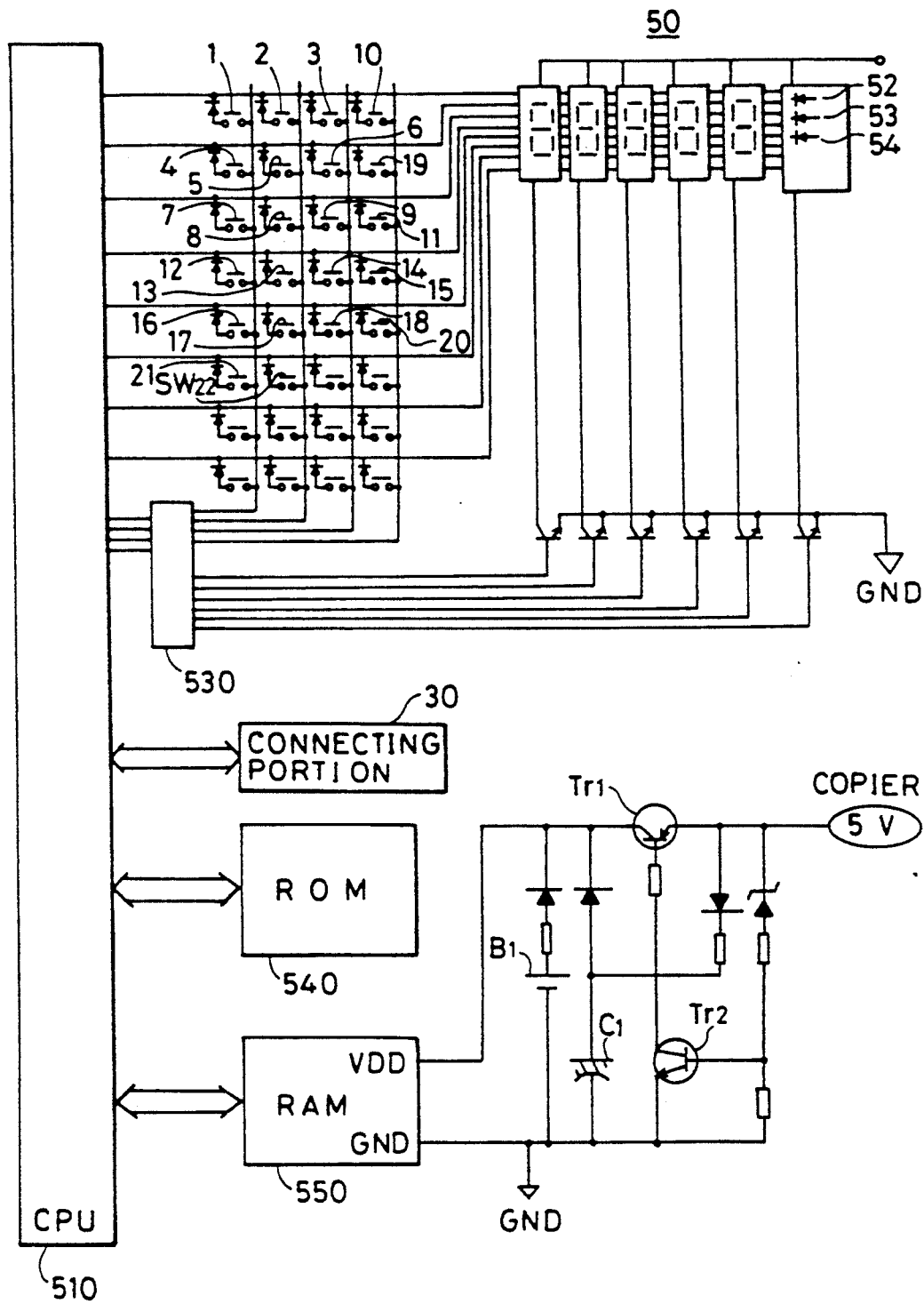
FIG. 2 is a diagram showing the configuration of a control circuit of the IC card of FIG. 1.

FIG. 1 is a diagram showing the appearance of an IC card employed in the system according to one embodiment of the present invention, and FIG. 2 is a control circuit diagram of the IC card.

An IC card 200 has a calculating function and a copying mode setting/storing function.

(1) Appearance (see FIG. 1 )

On an operation surface of IC card 200 are provided a group of ten-keys 1-10 for inputting numeric values, a group of four-arithmetical operation keys 12-16, a copying mode memory key 17 for instructing the system of the IC card to save copying mode data in a RAM 550 (see FIG. 2), a copying mode load key 18 for instructing the system to set in the main body of a copying apparatus the copying mode data saved in RAM 550, a power source ON/OFF key 20, a clear key 11 for instructing the clearing of data inputted, an interruption key 19 for instructing an interruption copying mode, and a calculating mode/copying mode switching key 21 for instructing the switching of calculating mode/copying mode.

As shown in FIG. 1, an indicator portion 50 is provided in the upper part of the operation surface. In indicator portion 50, such indications are performed as an indication of numeric values up to five digits by segment-indication devices 51, an indication of a copying mode by lighting-up of a PPC indicator 52, an indication of a calculating mode by lighting-up of a CAL indicator 53, and an indication of an interruption mode by lighting-up of an interruption mode indicator 54.

Further, in FIG. 1, the lower end portion of the operation surface includes a connecting portion 30 to be connected to an IC card connector 203 of the copying apparatus. The connecting portion 30 includes a connection detecting switch SW22 for detecting a connection state with the copying apparatus. FIG. 1 shows a case where connecting portion 30 is formed at the end portion close to copying mode memory key 17, copying mode load key 18, etc; however, it may be formed at the opposite end portion close to indicator portion 50 or at both end portions. A detailed description thereof will be given later.

(2) Control circuit ( see FIG. 2 )

A control circuit of IC card 200 is formed with a control CPU 510 playing a major role.

CPU 510 is connected with an ROM 540 for storing a control program, an RAM 550 for storing copying mode data or the like and is connected with the above described group of keys 1-21 and switch 22 via a decoder 530 and with indication devices 51-54 of indicator portion 50.

In the above configuration, RAM 550 is normally powered by a battery B1; however, when IC card 200 is connected to the copying apparatus, transistors Tr1 and Tr2 are turned on, so that RAM 550 is powered by a 5V power source of the copying apparatus. A condenser C1 is charged via connecting portion 30 with the IC card connected to the copying apparatus, and is powered upon exchange of battery B1.

Figure 10:
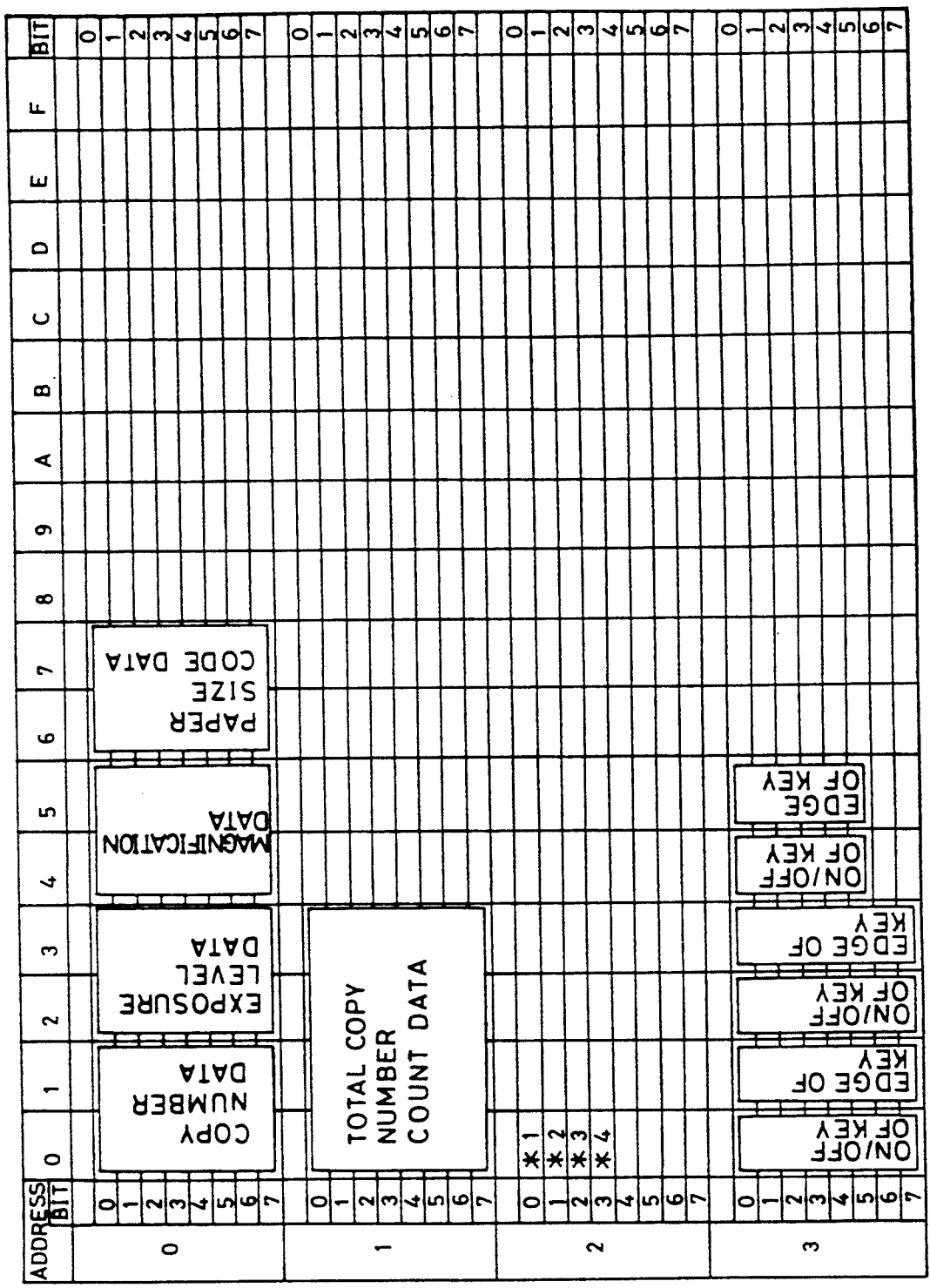
FIG. 10 is a descriptive diagram showing the memory configuration of the IC card of FIG. 1.

The RAM 550 has a memory configuration shown in FIG. 10.

That is, such data are stored in a predetermined address of RAM 550 as data representing the number of copies (hereinafter referred to as copy number data), exposure level data, magnification data, paper size code data, data representing the counted total number of copies (hereinafter referred to as total copy number count data or total number-of-copy count data), ON/-OFF data, and edge detection data of the group of keys and switch 1-22. An ON edge (or an OFF edge) represents a status change when the state of signals or the like is switched from an OFF state to an ON state (or from the ON state to the OFF state).

A zeroth bit to a third bit at address 20H of RAM 550 are set respectively as follows:

The zeroth bit (*1) is set as a power-on bit for controlling lighting on/off of indicator portion 50 of IC card 200 in correspondence with an ON edge of power source ON/OFF key 20 and for controlling standby of the copying apparatus (refer to FIGS. 18A and 18B);

The first bit (*2) is set as a read bit for controlling a data loading into the copying apparatus in correspondence with an ON edge of copying mode load key 18;

The second bit (*3) is set as a write bit for controlling a data saving in correspondence with an ON edge of copying mode memory key 17; and The third bit (*4) is set as an interruption bit for controlling setting/releasing of an interruption mode in 10 correspondence with an ON edge of interruption key 19.

2. Copying Apparatus

Figure 3:
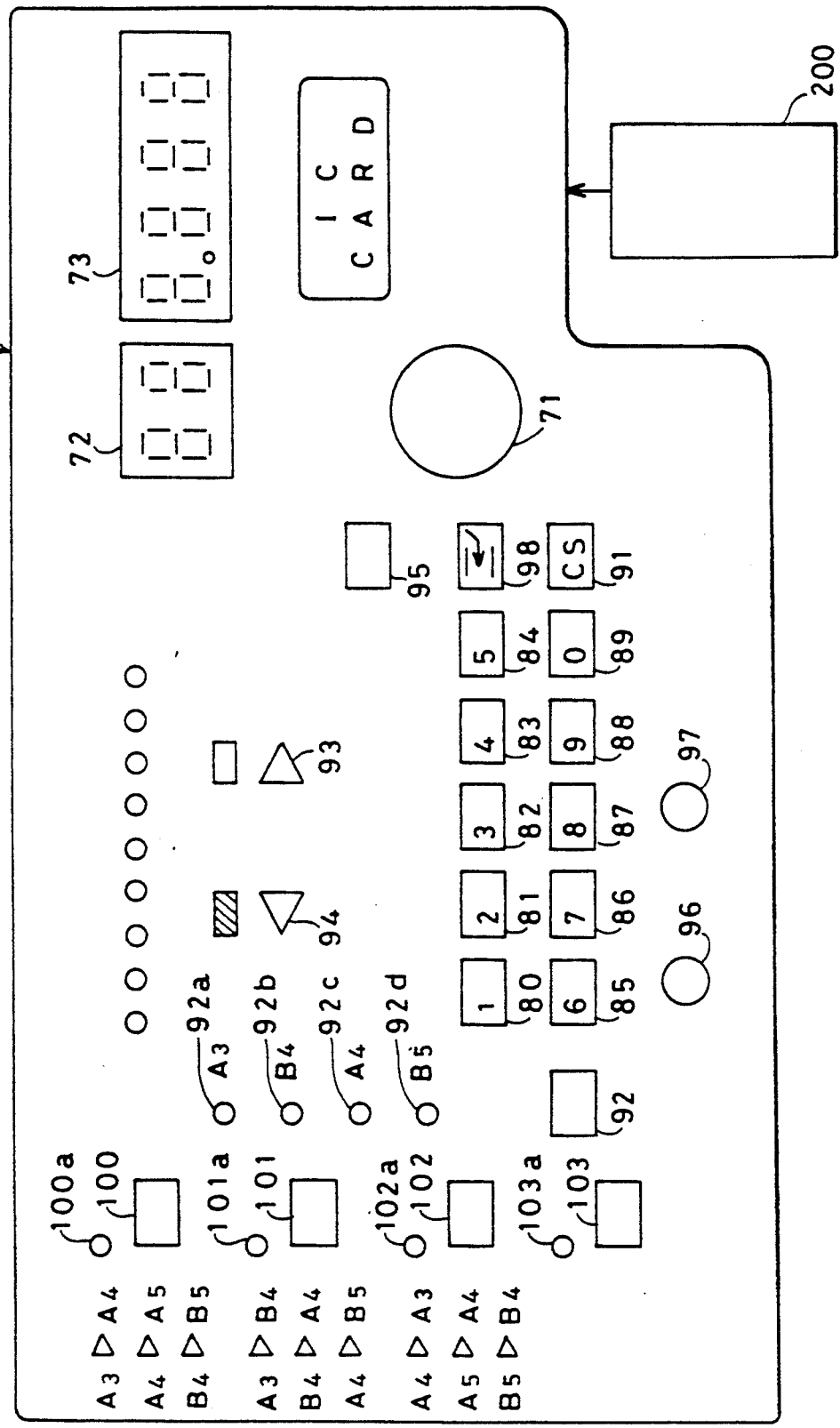
FIG. 3 is a diagram for describing the arrangement of an operation panel of a copying apparatus employed in the system according to one embodiment of the present invention.
Figure 4:
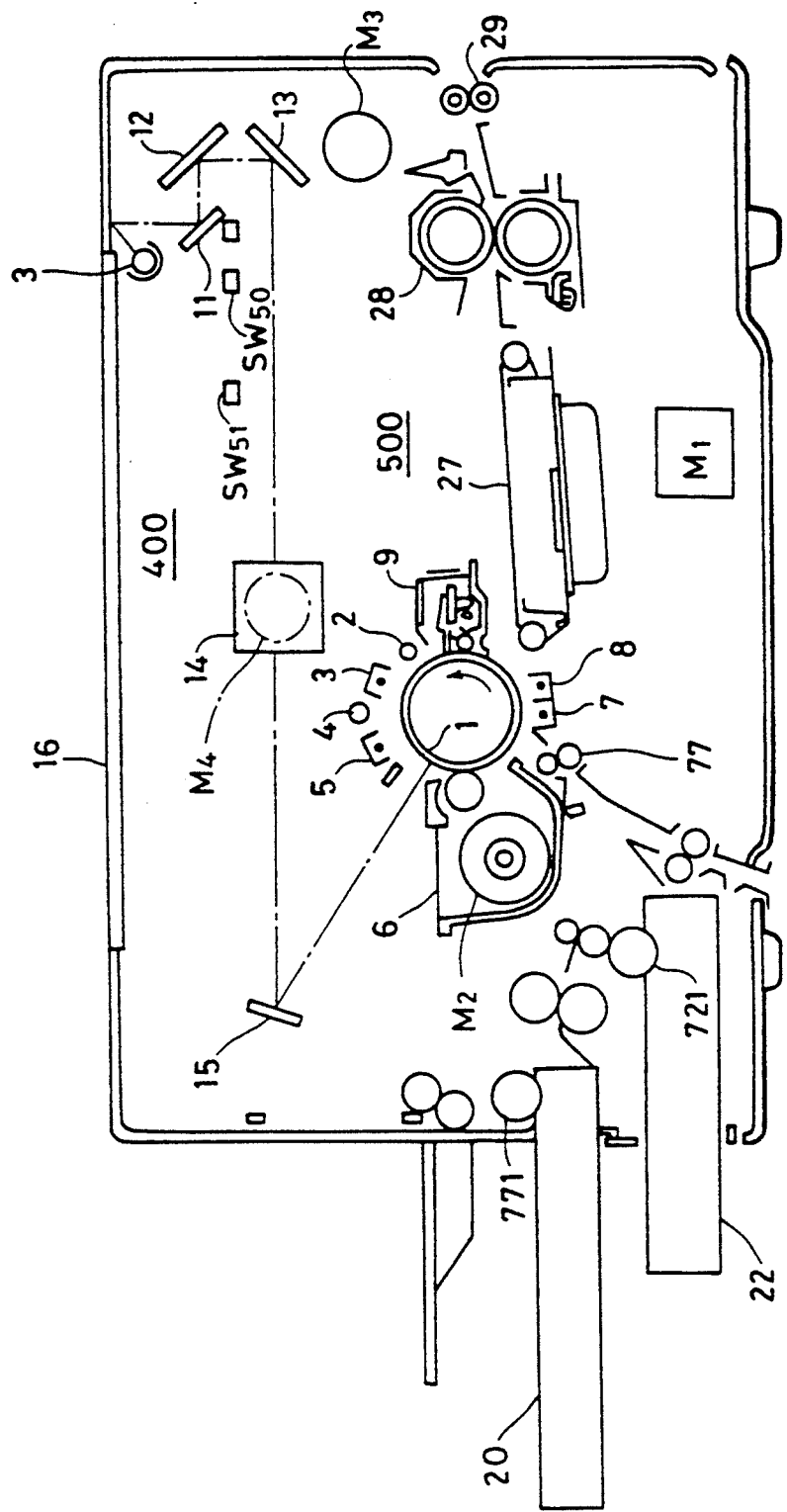
FIG. 4 is a diagram for describing the mechanism of the copying apparatus of FIG. 3.
Figure 5:
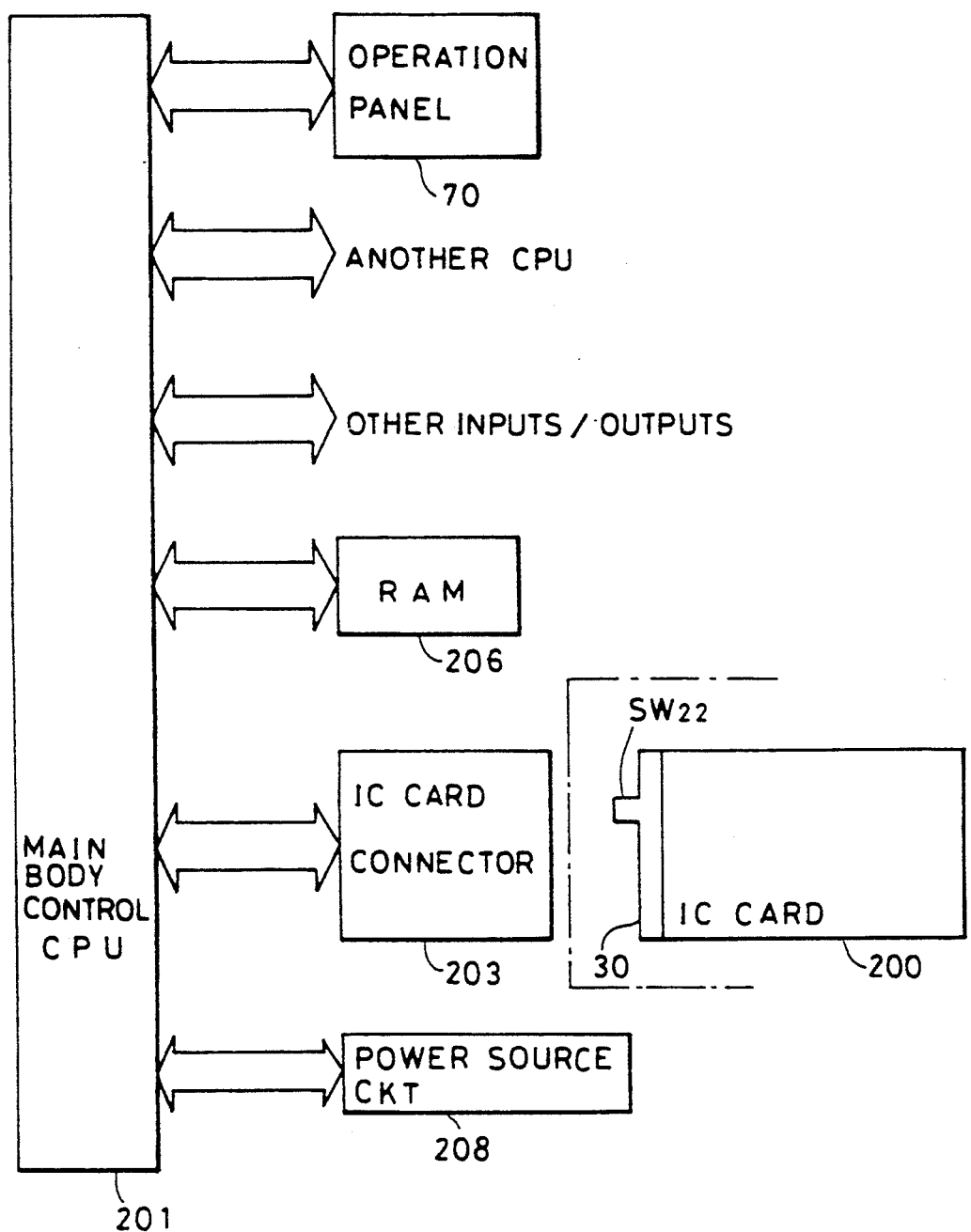
FIG. 5 is a block diagram of a control circuit of the copying apparatus of FIG. 3.

FIG. 3 is an operation panel diagram of a copying apparatus of the system according to one embodiment of the present invention; FIG. 4 is a schematic view showing He mechanism of the copying apparatus; and FIG. 5 is a block diagram showing a control circuit of the copying apparatus.

(1) Operation panel ( see FIG. 3 )

Figure 7:
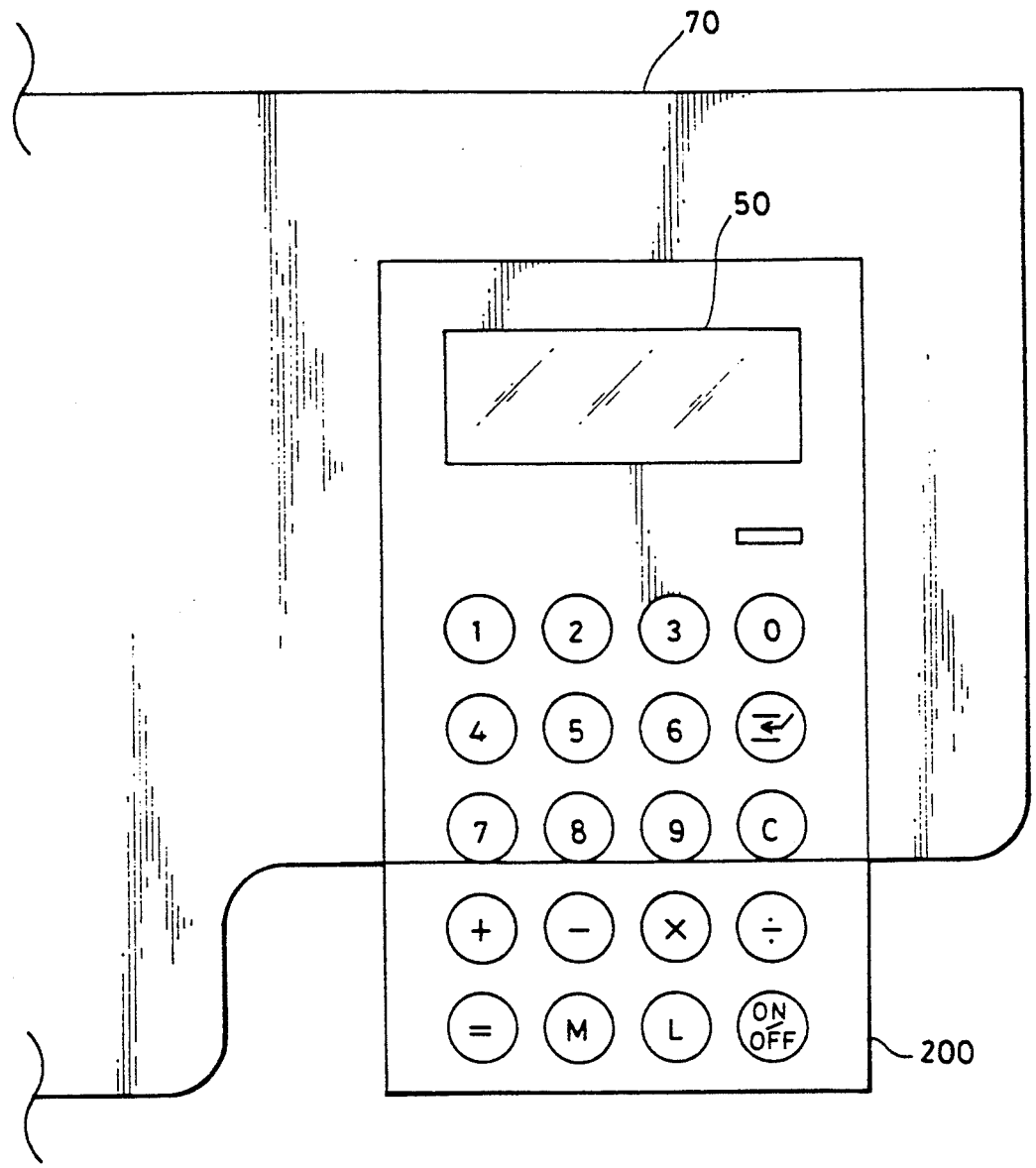
FIG. 7 is a diagram for describing a case where the IC card of FIG. 1 is set in the copying apparatus and showing a state after the IC card is set.
Figure 9:
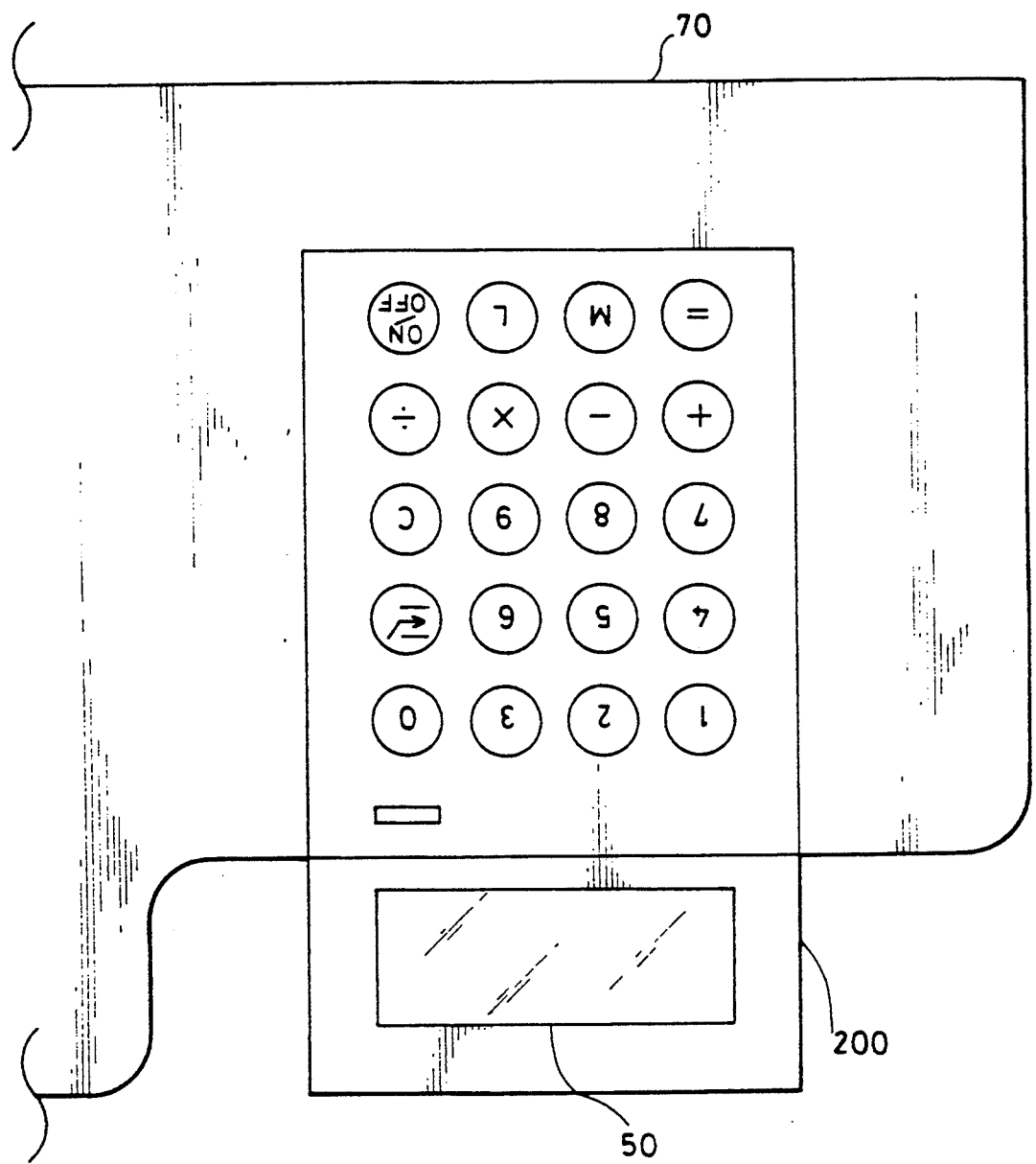
FIG. 9 is a diagram for describing a case where the IC card is set in the copying apparatus in a different manner from that of FIG. 7 and showing the state after the IC card is set.

IC card 200 is connected to the control circuit of the copying apparatus when inserted into an IC card insertion portion of an operation panel 70. There are two cases of a connection manner between IC card 200 and the copying apparatus as will be described later: one case where IC card 200 is inserted with its indicator portion 50 at the head (a connection manner A; FIG. 7), the other case where IC card 200 is inserted with its copying mode memory key 17 at the head (a connection manner B; FIG. 9).

On operation panel 70 are provided a two-digit numeric value indicator portion 72 for segmentary-indicating the number of copies, a four-digit numeric value indicator portion 73 for segmentary-indicating copying magnification, a start key 71 for instructing a start of a copying operation, a group of ten-keys 80–89 for inputting a numeric value, an all-clear key 95 for instructing the system to set a copying mode to an initial mode, exposure setting keys 93 and 94 for setting the amount of exposure, a copy paper select key 92 for selecting the size of copy paper, a group of copy paper size indicators 92a-92d for indicating the selected size of copy paper by lighting-up, a group of magnification select keys 100-103 for selecting copying magnification, a group of magnification indicators 100a-103a for indicating a selected copying magnification by lighting-up, an interruption key 98 for instructing the setting of an interruption mode, a total check key 96 for instructing the indication of the total number of copies, a calculation key 97 for instructing the setting of a calculation mode, and a clear/stop key 91 for instructing the clearing of data inputted and a copy stop.

The total number of copies, When IC card 200 and the copying apparatus are disconnected or when the connection manner A (FIG. 7) is set, is indicated up to six digits by employing two-digit numeric value indicator portion 72 and four-digit numeric value indicator portion 73, as will be described later (refer to FIG. 20; S707, S709, FIG. 21A; S763).

Figure 21A:
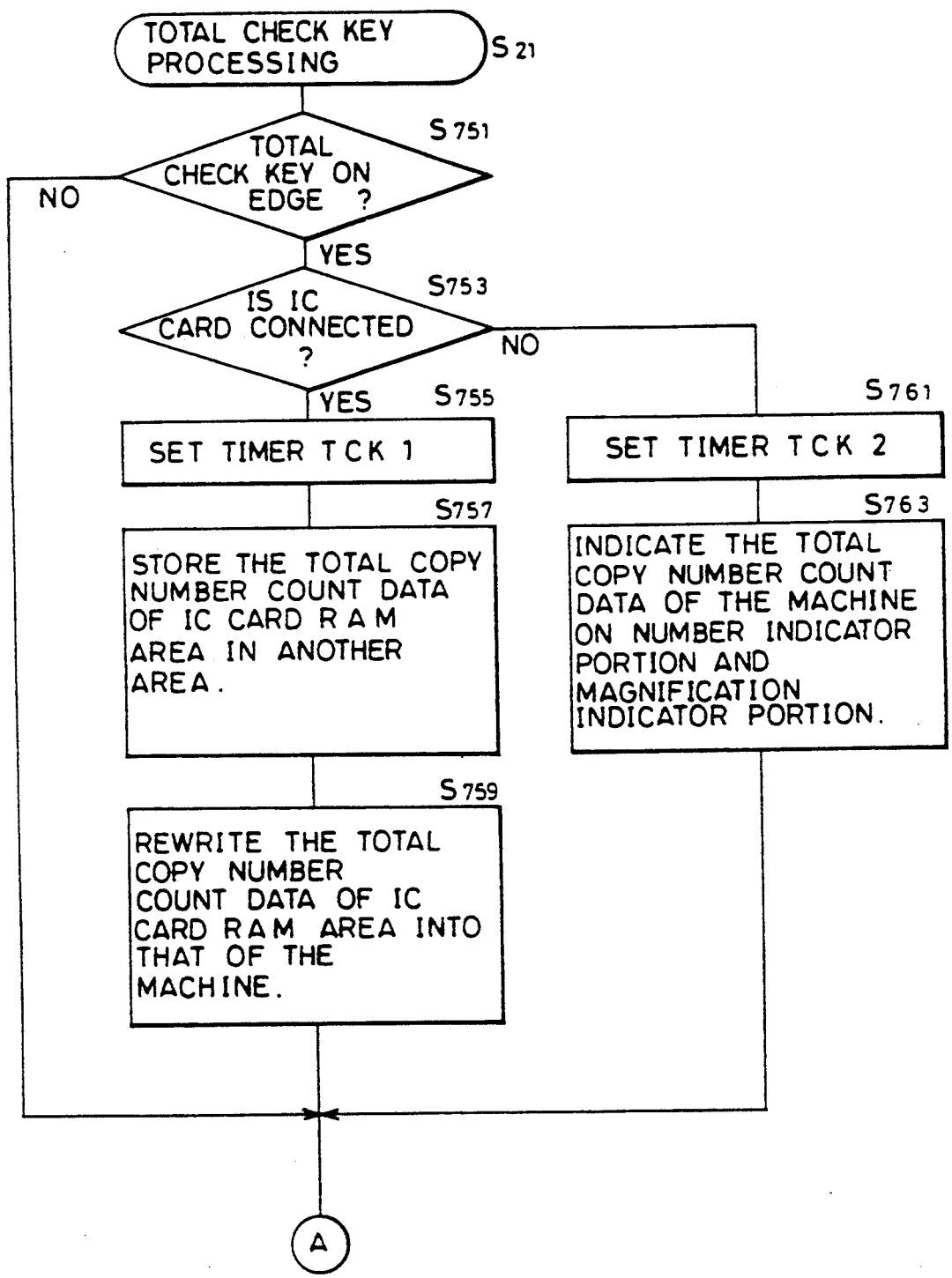
FIGS. 21A and 21B are flow charts showing another example of the detailed contents of the total check key processing of FIG. 13.

In connection manner B (FIG. 9), the total number of copies is indicated in indicator portion 50 of IC card 200, with an indicated numeric value inverted in horizontal and vertical directions (FIG. 21A; S757, S759, FIG. 29; S1605 ).

When a calculation mode is set in connection manner A (FIG. 7), inputs from four-arithmetic operation keys 12-16 of IC card 200 are acceptable (see FIG. 22; S817).

(2) Mechanism of the copying apparatus (see FIG. 4)

The copying apparatus according to the present invention serves to scan by exposure an original placed on a platen 16 and then allow reflected light thereof to be imaged on a photoreceptor drum 1, thereby to reproduce an image of the original onto paper by employing electrophotographic process.

An optical system 400 for transmitting the reflected light of the original to photoreceptor drum 1 to be imaged thereon includes an exposure lamp 3, reflecting mirrors 11, 12 and 13, a lens system 14 and a reflecting mirror 15. The exposure lamp 3 and reflecting mirror 11, and the reflecting mirrors 12 and 13 are driven by a motor M3 at a speed of V/N (V: circumferential speed of photoreceptor drum 1, N: copying magnification) and at a speed of V/2N, respectively, so as to scan the original by exposure while moving along platen 16. A positional adjustment of lens system 14 driven by a motor M4 and also an angular adjustment of reflecting mirror 15 enables the setting of copying magnification and the correction of a position where an image is formed. Sensor switches SW50 and SW51 serve to detect the position of a movable body (not shown) of optical system 400.

The electrophotographic process is performed by an image forming system 500 with photoreceptor drum 1 centered therein.

There are provided at the periphery of photoreceptor drum 1, eraser lamps 2 and 4 for discharging the surface of photoreceptor drum 1, corona chargers 3 and 5 for uniformly charging the surface of photoreceptor drum 1, a developing device 6 (the symbol M2 represents a developing motor) for toner-developing an electrostatic latent image formed on the surface of drum 1, a transfer charger 7 for transferring a toner image of the surface of drum 1 onto paper, a copy paper separation charger 8 for separating the paper having the transferred toner image thereon from photoreceptor drum 1, and a cleaner device 9 for removing residual toner on the surface of drum 1.

A copy paper is drawn from one of two paper feed cassettes 20 and 22 by paper feed rollers 771 and 721, then transported to a timing roller pair 77 and fed between photoreceptor drum 1 and transfer charger 7 at a predetermined timing, thereby to be subjected to the above described transfer processing. Thereafter, the transfer-processed copy paper is separated from photoreceptor drum 1, then transported through a transport belt 27 to a fixing device 28 to be subjected to a fixation processing by heat pressing, and then discharged Out of the apparatus by a discharge roller pair 29. The symbol M1 represents a main motor for driving those devices.

(3) Control circuit (see FIG. 5)

The control circuit of the copying apparatus according to the present invention includes a control CPU 201.

The CPU 201 controls the operation of the main body of the copying apparatus. To CPU 201 an RAM 206 for storing the total number of copies and the like, operation panel 70, etc. are connected.

The connecting portion 30 of IC card 200 is connected via IC card connector 203 to CPU 201. A connection state is detected such as by reading an area in RAM 550 of IC card 200 which stores the state of a connection detecting switch SW22. Further, a power supply circuit 208 for controlling power supply to each part of the copying apparatus is connected to CPU 201.

Inputs/outputs of a group of various types of sensors, motors, fixing devices and the like are represented wholly as "other inputs/outputs". CPUs other than CPU 201 for controlling the main body of the copying apparatus are also represented wholly as "other CPUs".

3. Connection Between IC Card and copying Apparatus

The IC card and copying apparatus are connected to each other in one of the following two connection manners.

(1) Connection manner A

Figure 6:
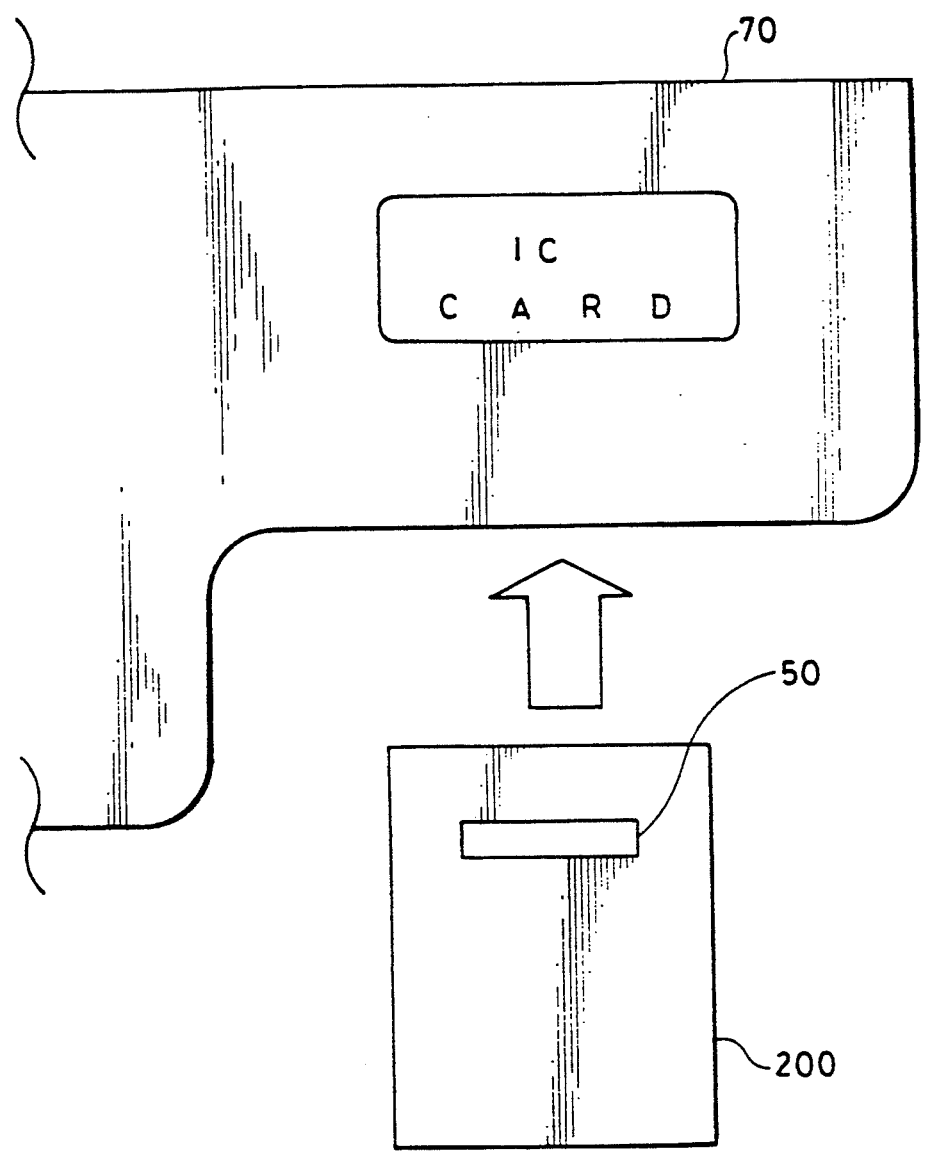
FIG. 6 is a diagram for describing a case where the IC card of FIG. 1 is set in the copying apparatus and showing a state before the IC card is set.

FIGS. 6 and 7 are diagrams showing a case where IC card 200 is connected to the copying apparatus with its one end portion on indicator portion 50 side at the head. In this case, IC card 200 is different from the one shown in FIG. 1 in that connecting portion 30 is formed at the end portion on indicator portion 50 side.

In connection manner A, it is apparent from FIG. 7 that four-arithmetic operation keys 12-16, memory key 17, load key 18 and power source ON/OFF key 20 are all being exposed, thereby enabling use of four-arithmetic operation keys 12-16 in a calculation mode (refer to FIG. 22; S817).

(2) Connection manner B

Figure 8:
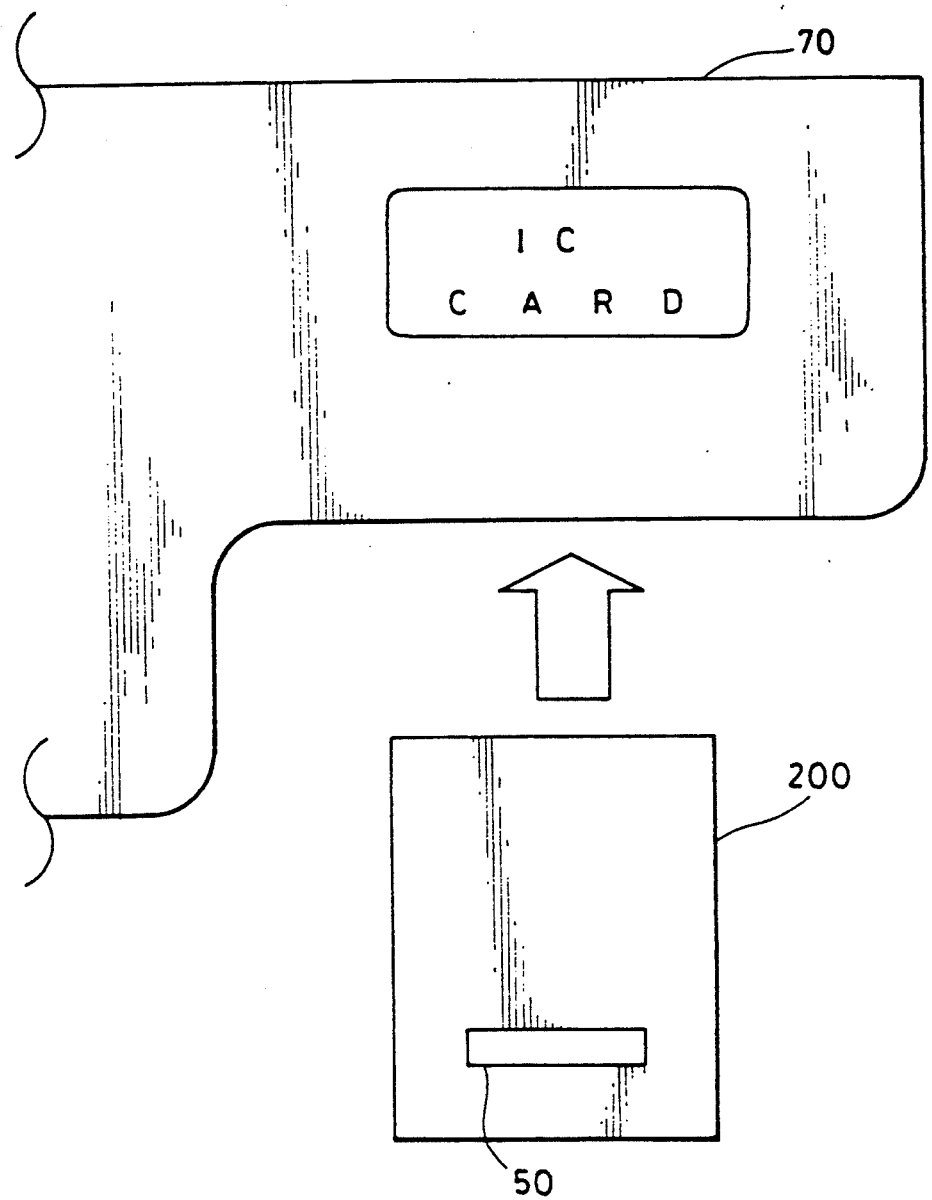
FIG. 8 is a diagram for describing a case where the IC card is set in the copying apparatus in a different manner from that of FIG. 6 and showing the state before the IC card is set.

FIGS. 8 and 9 are diagrams showing a case where IC card 200 is connected to the copying apparatus with its one end on four-arithmetic operation key group 12-16 side at the head. In this case, IC card 200 is the same as the one shown in FIG. 1, with connecting portion 30 formed at the end portion on four-arithmetic operation key group 12-16 side. The connecting portion 30 may be formed on the opposite end portions of IC card so that connection manner A or B can be arbitrarily selected.

In connection manner B, it is apparent from FIG. 9 that indicator portion 50 is being exposed available for use.

Thus, in the system of the present invention, a numeric value indication of indicator portion 50 is inverted in horizontal and vertical directions as follows to indicate the total number of copies on the copying apparatus or IC card 200 (refer to FIG. 21A; S759, FIG. 29; S1605).

A principle of inverting the numeric value indication will now be described with reference to FIGS. 11A-11C and 12.

Figure 11A:
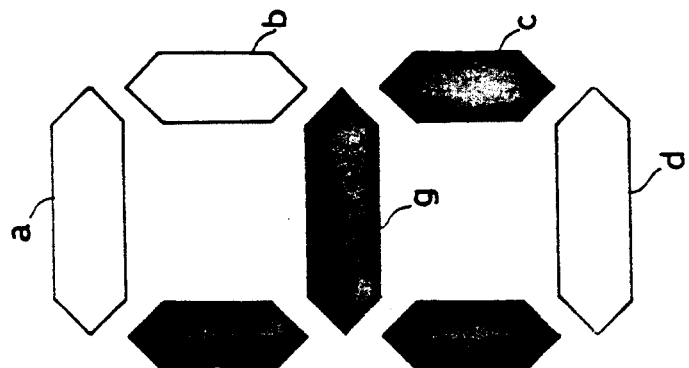
FIGS. 11A–11C are diagrams for describing a case where an indication is inverted in a vertical direction in accordance with a light-up state of 7-segment devices according to one embodiment of the present invention.
Figure 11B:
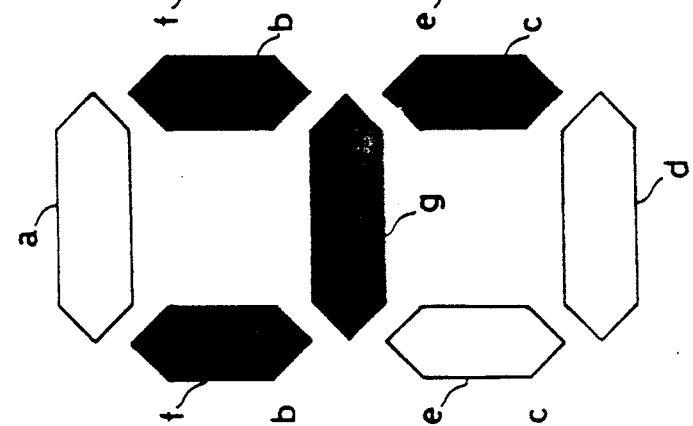

For example, a numeric value "4" is indicated in a normal state by lighting-up of b, c, f and g devices out of the segment devices, as shown in FIG. 11B.

Figure 11C:
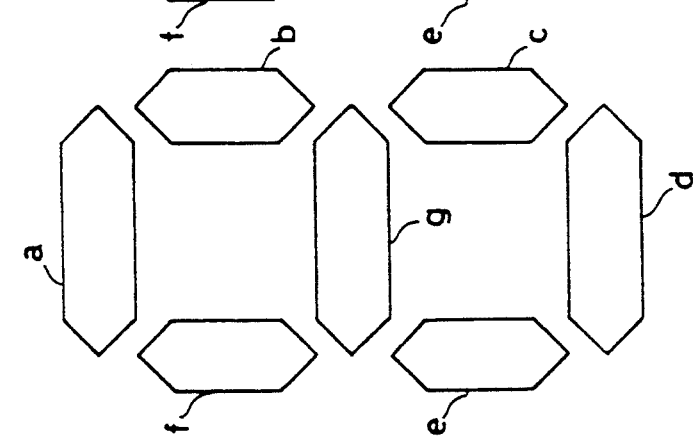

Therefore, in order to invert this numeric value in a vertical direction, c, e, f and g devices should light up as shown in FIG. 11C.

Figure 12A:
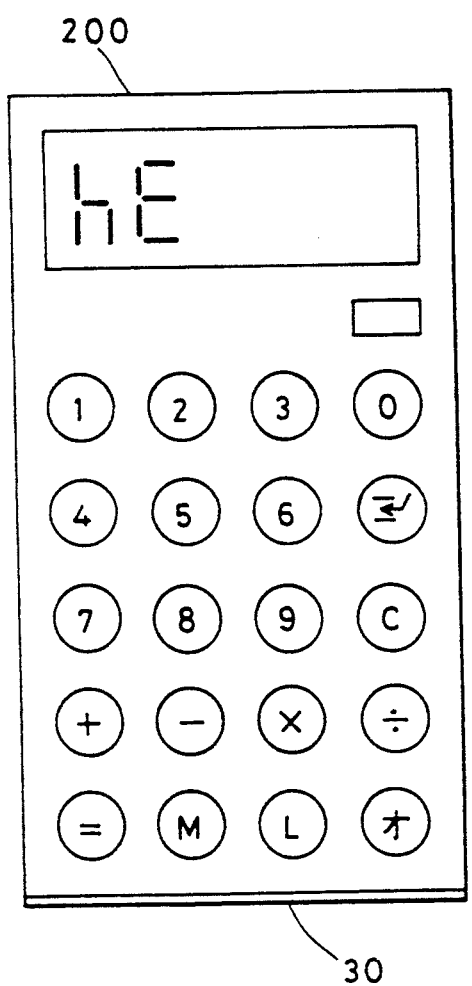
FIGS. 12A and 12B are diagrams for describing a case where an indication is inverted in a vertical direction in accordance with the light-up state of a group of 7-segment devices of five digits according to one embodiment of the present invention.
Figure 12B:
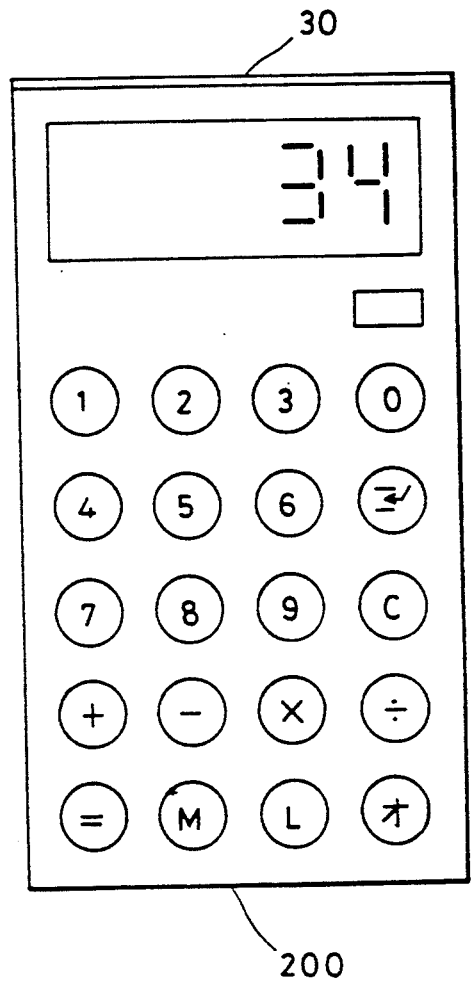

In order to indicate a numeric value "34", in a normal state, "4" in the unit's place is indicated by lighting-up of the segment devices at the right end and "3" in the ten's place is indicated by the segment device second from the right end, as shown in FIG. 12B.

Therefore, in order to invert this numeric value in a horizontal direction, "4" in the unit's place should be indicated by the segment devices at the left end and "3" in the ten's place by those second from the left end.

Based on the foregoing principle, the inversion of numeric value indication in vertical and horizontal directions is carried out in connection manner B.

4. Processings in CPU 201

FIGS. 13-21 are flow charts showing the processings in control CPU 201 of the copying apparatus.

(1) Main routine (see FIG. 13)

The control CPU 201 of the copying apparatus starts processings by the connection of a power source line.

The CPU first executes initialization (S11) and then starts an internal timer for defining execution time of one routine (S13).

The CPU then executes any necessary processings such as IC card RAM checking (S15), an IC card inserting/extracting (S17), a total copy number counting (S19), a total check key processing (S21), a calculation (S23), a copying operation processing (S27) and processings other than the above processings (S29: other processings) and waits for the completion of the internal timer in step S31. Thereafter, the CPU returns to step S13 to repeat the above described processings.

The contents of each of those processings will now be described.

(2) IC card RAM checking

FIGS. 14-17 are flow charts showing the details of IC card RAM checking.

The IC card RAM checking is a processing to be executed in a state that the IC card and copying apparatus are connected to each other (S101; YES). The following processings are executed in accordance with status of each of a read bit, write bit and interruption bit.

The connection manner A (FIG. 7) in which keys 17 and 18 of IC card 200 are operable in a connection state is premised in order to allow the read bit and write bit to be set to 1, as will be described later (FIG. 25; S1205, FIG. 26; S1307).

The connecting state between IC card and copying apparatus is detected, for example, by accessing RAM 550 of the IC card to read a bit representing the status of switch SW 22.

(2-i) Read bit checking

Figure 14:
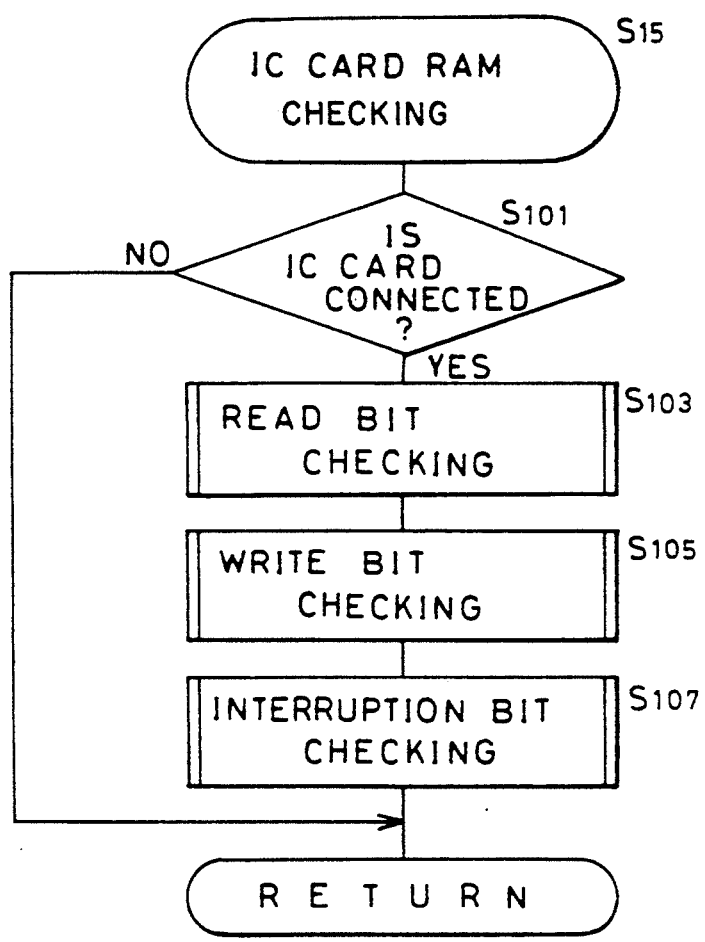
FIG. 14 is a flow chart showing the detailed contents of an IC card RAM checking of FIG. 13.
Figure 15:
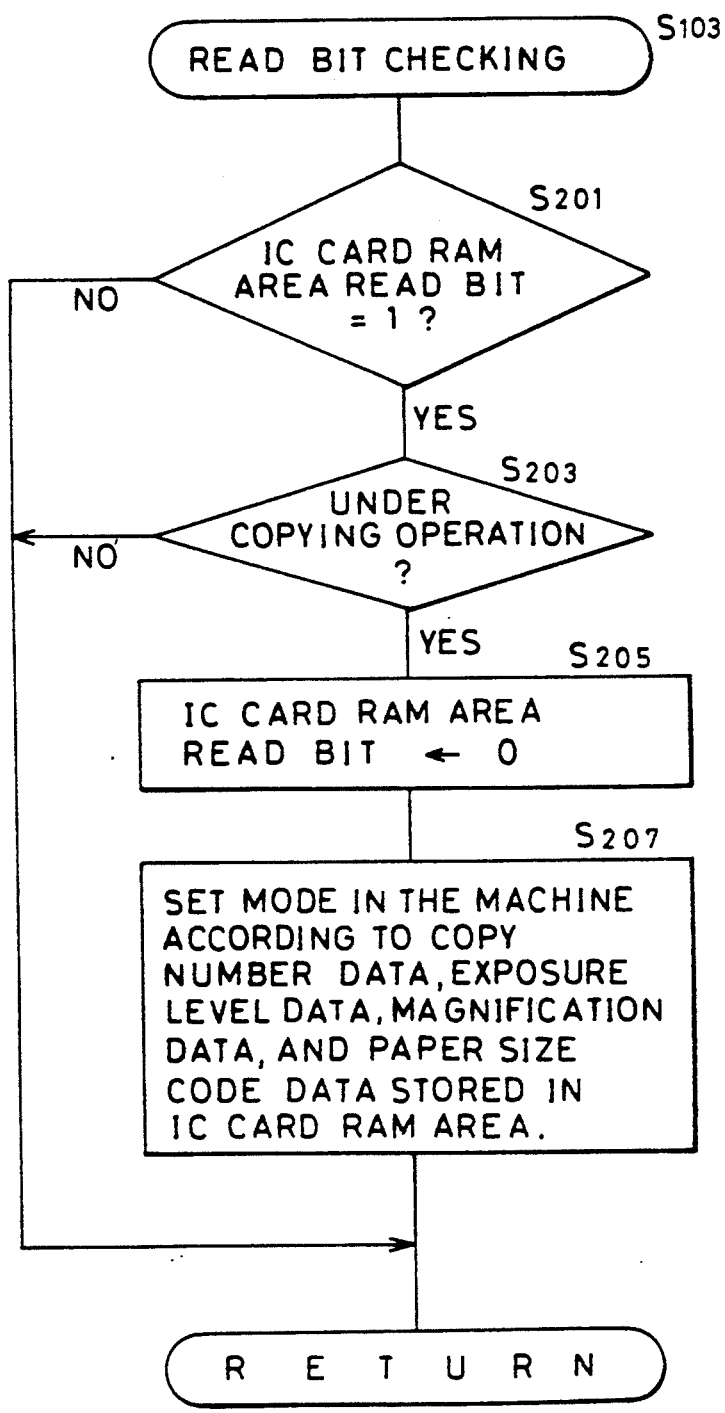
FIG. 15 is a flow chart showing the detailed contents of a read bit checking of FIG. 14.

FIG. 15 is a flow chart showing the detailed contends of read bit checking of FIG. 14.

In case where the read bit of RAM 550 of IC card (see FIG. 10) was set (or is set) to 1 (S201; YES), the CPU resets the read bit of RAM 550 to 0 (S205) on condition that the copying apparatus is not performing the copying operation (S203; YES), and then reads data of a copying mode (the number of copies, exposure level, magnification, paper size code; see FIG. 10) stored in RAM 550 so as to set the read copying mode data in the copying apparatus (S207).

(2-ii) Write bit checking

Figure 16:
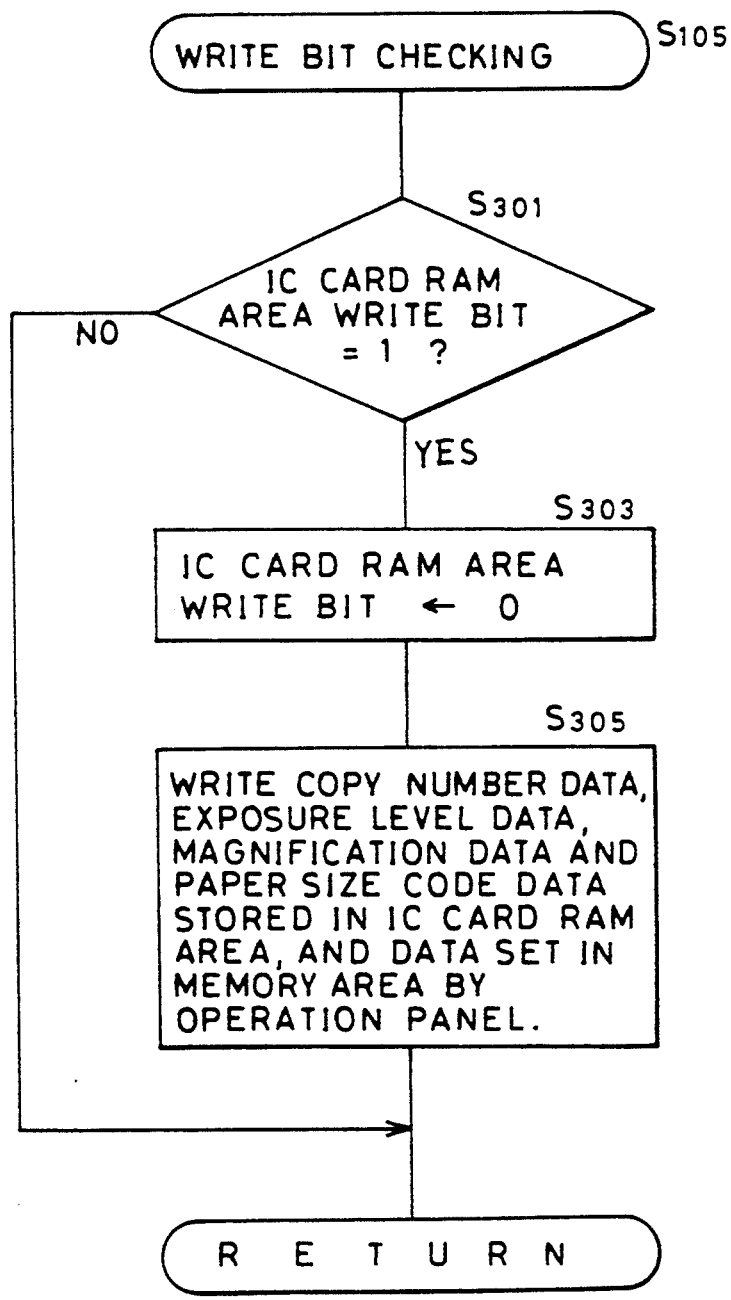
FIG. 16 is a flow chart showing the detailed contents of a write bit checking of FIG. 14.

FIG. 16 is a flow chart showing the details of write bit checking of FIG. 14. In case where the write bit of RAM 550 of IC card (see FIG. 10) is set to 1 (S301; YES), the CPU resets the write bit of RAM 550 to 0 (S303) and thereafter writes a copying mode (the number of copies, exposure level, magnification, paper size code) set on operation panel 70 of the copying apparatus into the area (see FIG. 10) of that data of RAM 550 (S305).

(2-iii) Interruption bit checking

FIG. 17 is a flow chart showing the detailed contends of interruption bit checking of FIG. 14.

In case where the interruption bit of RAM 550 of IC card (see FIG. 10) is set to 1 (S401; YES), the CPU resets the interruption bit of RAM 550 to 0 (S403) and then sets an interruption status flag (S405). The interruption status flag is a flag for controlling an interruption copying mode set by the IC card.

Next, the CPU determines whether or not copying is being carried out. When copying is being made (S407; YES), the CPU interrupts the copying operation (S409) to save the data (the number of copies, the number of remaining copies, exposure level, magnification, paper size code) at the time of interruption into RAM 206 of the copying apparatus (S411).

When the CPU makes determination in step S407 that the copying operation is not being carried out (S407; NO), it saves the data of copying mode set in the copying apparatus into RAM 206 (S413).

As described above, if the interruption mode is registered in IC card 200 in advance, the connection of IC card 200 to the copying apparatus enables the interruption mode to be set in the copying apparatus.

(3) IC card inserting/extracting (see FIG. 18)

The copying apparatus is put in a standby state in case where a power-on bit (see FIG. 10) of RAM 550 of the IC card is set to 1 (S503; YES) when the IC card is connected to the copying apparatus (S501; YES).

That is, in case where a power supply to image forming system 500 is interrupted by a power supply circuit which turns off a main power source of the copying apparatus (S503; YES), a predetermined signal is transmitted to the power supply circuit to turn on the main power source (S507).

When a power-saving state is set (S509; YES) even in case where the main power source is ON (S505; NO), the power-saving state is released (S511). The power-saving state is, for example, a state provided to reduce power consumption and also put the copying apparatus in the standby state in a shorter period of time than required for a normal standby of the copying apparatus which starts from the turning on of the main power source by lighting off the indication on the operation panel and by maintaining the temperature of a fixing heat roller slightly lower than an operation temperature.

Meanwhile, in case where the IC card is not set in the copying apparatus (S513; YES) with no copying operation being carried out (S515; YES) and with the interruption flag is being set (S517; YES), the CPU resets the interruption flag (S519) to restore the copying mode saved in RAM 206 of the copying apparatus (S521). Accordingly, when the IC card is extracted during the execution of the copying operation, for example, the interruption mode is released after completion of the operation.

(4) Total copy number counting

Figure 19:
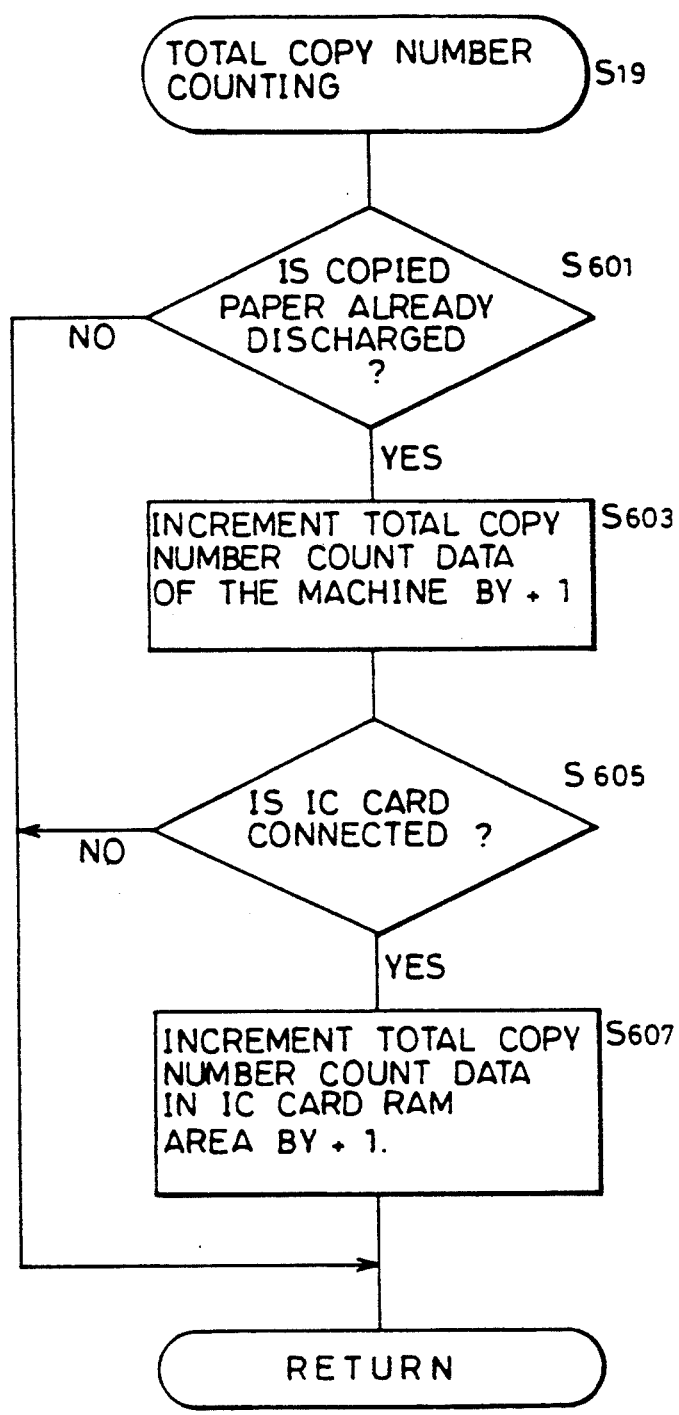
FIG. 19 is a flow chart showing the detailed contents of a processing of counting the total number of copies of FIG. 13.

FIG. 19 is a flow chart showing the total copy number. counting processing.

Each time paper subjected to an image fixing processing is discharged to the outside of the apparatus is (S601; YES), total copy number data (or total number-of-copy data) of RAM 206 of the copying apparatus is incremented one by one (S603).

Furthermore, in case where the IC card is connected to the copying apparatus when the above described paper discharge is completed (S605; YES), total copy number data of RAM 550 of the IC card is also incremented by one (S607).

(5) Total check key processing

FIG. 20 is a flow chart showing the total check key processing. FIG. 20 indicates the case of connection manner A, while FIG. 21A indicates the case of connection manner B. These two processings are to be executed alternatively. The selection of the processings to be executed (FIG. 20 or FIGS. 21A and 21B) is determined by which connection portion is connected to the copying apparatus, and hence a determination processing thereof or the like will not be described here.

(5-i) Connection manner A (see FIG. 20)

When an ON edge of total check key 96 is detected (S701; YES), a timer TCK is started (S703).

The CPU then makes determination whether or not the IC card is connected to the copying apparatus. When the card is connected to the apparatus (S705; YES),. the CPU reads total number-of-copy data of RAM 550 of the IC card and then indicates the total number of copies up to six digits by employing number indicator portion 72 and magnification indicator portion 73 on the operation panel of the copying apparatus (S707).

When the CPU makes determination that the IC card is not connected to the apparatus in step S705 (S705; NO), the CPU reads total number-of-copy data of RAM 206 of the copying apparatus and then indicates the read number up to six digits by employing number indicator portion 72 and magnification indicator portion 73 on the operation panel of the copying apparatus (S709).

Thereafter, when timer TCK completes its operation (S711; YES), the CPU restores the indication of number indicator portion 72 and magnification indicator portion 73 to the original indication (the indication of the number of and magnification of copies) (S713).

Figure 21B:
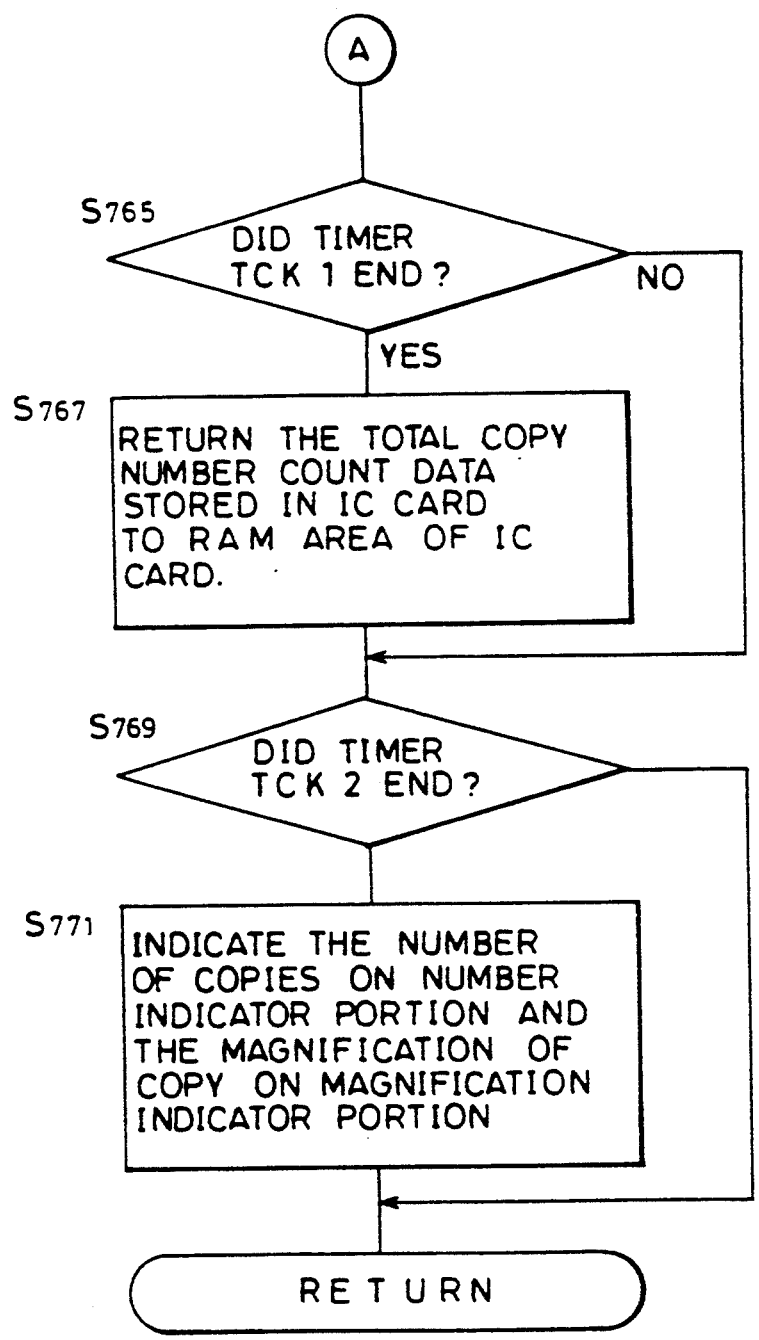

(5-ii) Connection manner B (see FIGS. 21A and 21B)

When the ON edge of total check key 96 is detected (S751; YES), a determination is first made whether or not IC card 200 is connected to the copying apparatus (S753).

Consequently, when IC card 200 is connected to the apparatus (S753; YES), a timer TCK1 is started (S755). Further, the CPU allows data at address 10H-13H (total number-of-copy count data; see FIG. 10) of RAM 550 of IC card 200 to be saved in another area (S757). The total number-of-copy data of the copying apparatus is written at address 10H-13H (S759). This results in an inverted indication of a total copy number value of the copying apparatus on indicator portion 50 of IC card 200 (FIG. 29; S1605).

Thereafter, when time defined by timer TCK1 has passed (S765; YES), the total number-of-copy count data of IC card is restored to address 10H-13H (S767).

When the CPU makes a determination in step S753 that IC card 200 is not connected to the apparatus (S753; NO), it starts a timer TCK2 (S761) and also indicates the total copy number value of the copying apparatus up to six digits by employing number indicator portion 72 and magnification indicator portion 73 (S763).

Thereafter, when time defined by timer TCK2 has passed (S769; YES), the CPU restores the original indication to number indicator portion 72 and magnification indicator portion 73 (S771).

The total check key processing is executed according to the connection manner to be executed, as described above.

(6) Calculation (see FIG. 22)

FIG. 22 is a flow chart showing calculation.

When an ON edge of calculation key 97 is detected (S803; YES) with the IC card being connected to the apparatus (S801; YES), the CPU sets a calculation mode flag (S811) on condition that the calculation mode flag is not yet set (S805; NO), and then sets magnification indicator portion 73 in a numeric value indicator portion in a calculation mode (S813).

When the calculation mode is thus set (S811 or S815; YES), the group of ten-keys 80–89 on the operation panel of the copying apparatus and the group of arithmetic operation keys 12–16 of the IC card are put in an input queue state. That is, a calculation is executed in accordance with the inputs of these keys 80–89, 12–16 (S817). In addition, an input value and calculation value is indicated sequentially on magnification indicator portion 73 (S819), and a result of arithmetic operation is set as magnification data of the copying apparatus (S821).

Meanwhile, when the ON edge of calculation key 97 is again detected (S803; YES, S805; YES) with the IC card being connected to the apparatus (S801; YES), the CPU resets the calculation mode flag (S807) and then restores the indication of magnification indicator portion 73 to the original indication of magnification (S809).

In case where the IC card is not connected to the apparatus (S801; NO), the calculation mode is not set, and a magnification value is indicated on indicator portion 73 (S807, S809).

5. Processings in CPU 510

FIGS. 23–29 are flow charts showing processings carried out in control CPU 510 of IC card 200.

Figure 23:
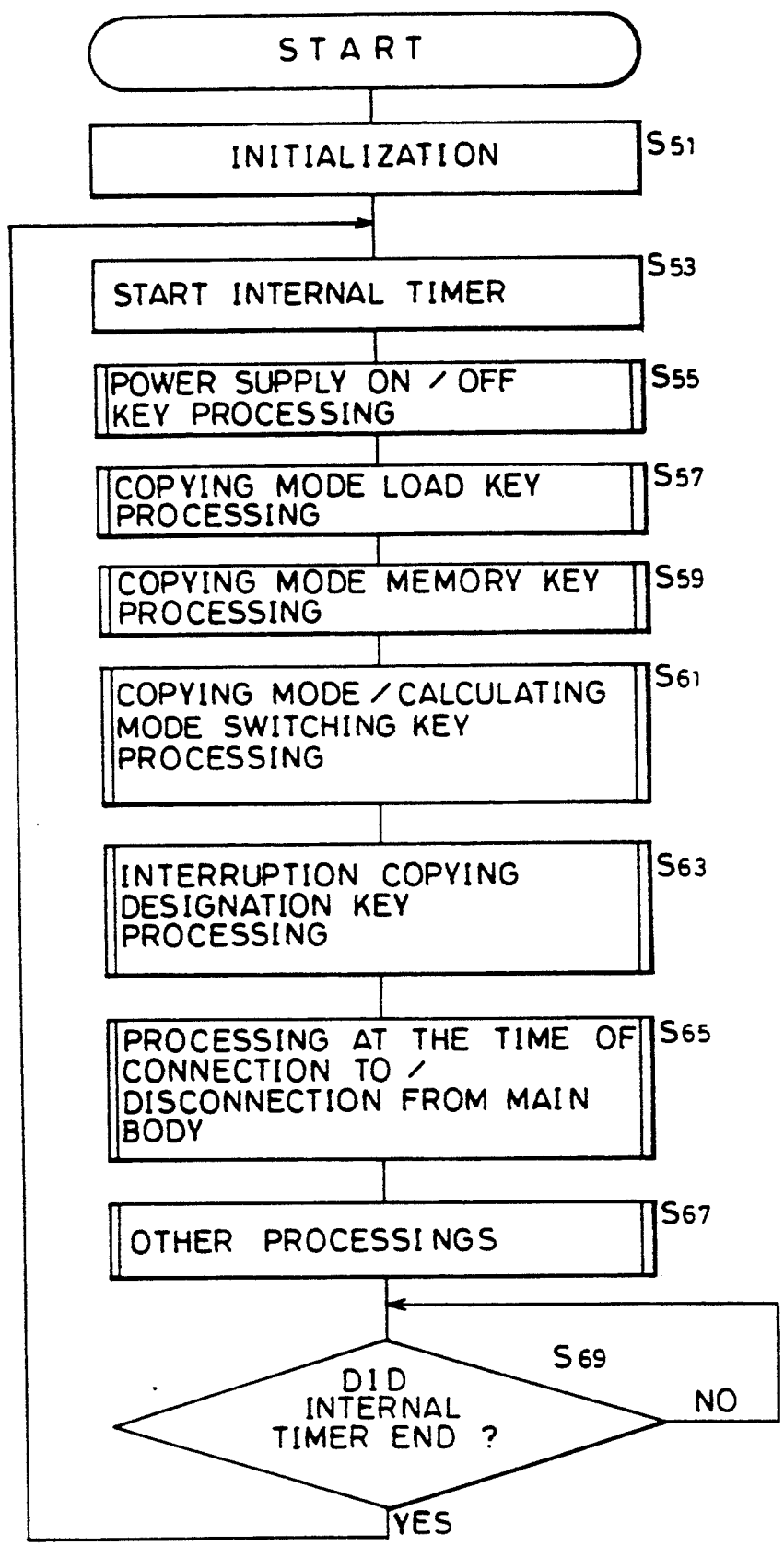
FIG. 23 is a flow chart showing the processing of a main routine carried out by a control CPU 510 of the IC card of FIG. 2

(1) Main routine (see FIG. 23)

The control CPU 510 of the IC card starts processings when, for example, a battery B1 is set.

First, the CPU executes initialization (S51) and then starts an internal timer for defining execution time of one routine (S53).

Next, the CPU executes any necessary operations such as a power source ON/OFF key processing (S55), a copying mode load key processing (S57), a copying mode memory key processing (S59), a copying mode/-calculating mode switching key processing (S61), an interruption copying designating key processing (S63), a processing upon connection with/disconnection from the main body (S65) and processings other than the above processings (S67), and then waits for the completion of the internal timer in step S69. Thereafter, the CPU returns to step S53 to repeat the above described processings.

Each of the processings will now be described.

(2) Power source ON/OFF key processing

Figure 24:
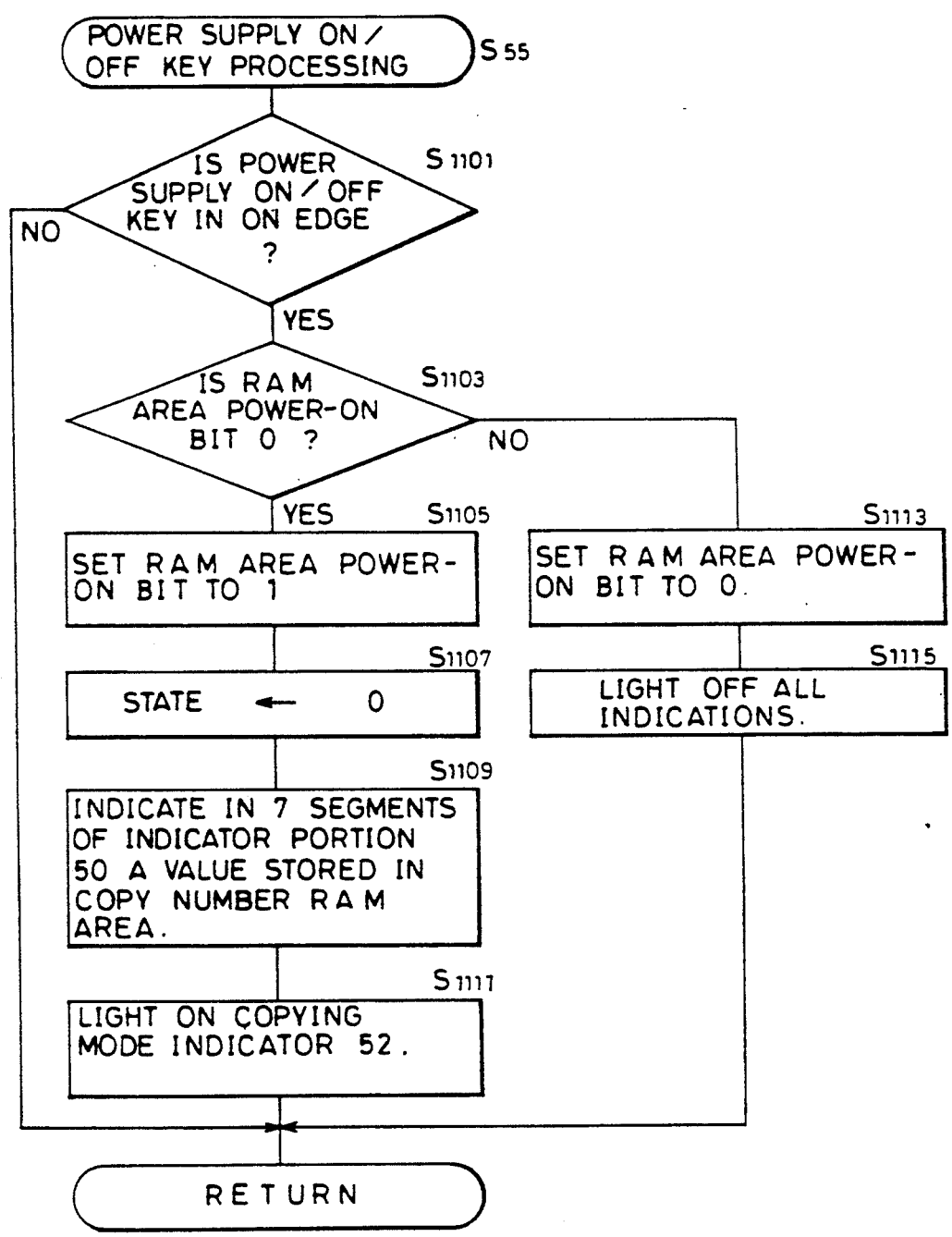
FIG. 24 is a flow chart showing the detailed contents of a power source ON/OFF key processing of FIG. 23.

FIG. 24 is a flow chart showing the power source ON/OFF key processing of FIG. 23.

With an ON edge of power source ON/OFF key 20 detected (S1101; YES), the CPU determines the status of the power-on bit (see FIG. 10) (S1103).

Consequently, when the power-on bit is 0 (S1103; YES), the CPU sets the power-on bit to 1 (S1105) to set the status to 0 (S1107). In addition, the CPU indicates the number of copies stored in RAM 550 by employing segment indication devices 51 of indicator portion 50 of the IC card (S1109) and further lights on copying mode indicator 52 (S1111).

Meanwhile, when the CPU makes a determination in step S1103 that the power-on bit is 1 (S1103; NO), it sets the power-on bit to 0 (S1113) and then lights off the entire indication (S1115).

(3) Copying mode load key processing

Figure 25:
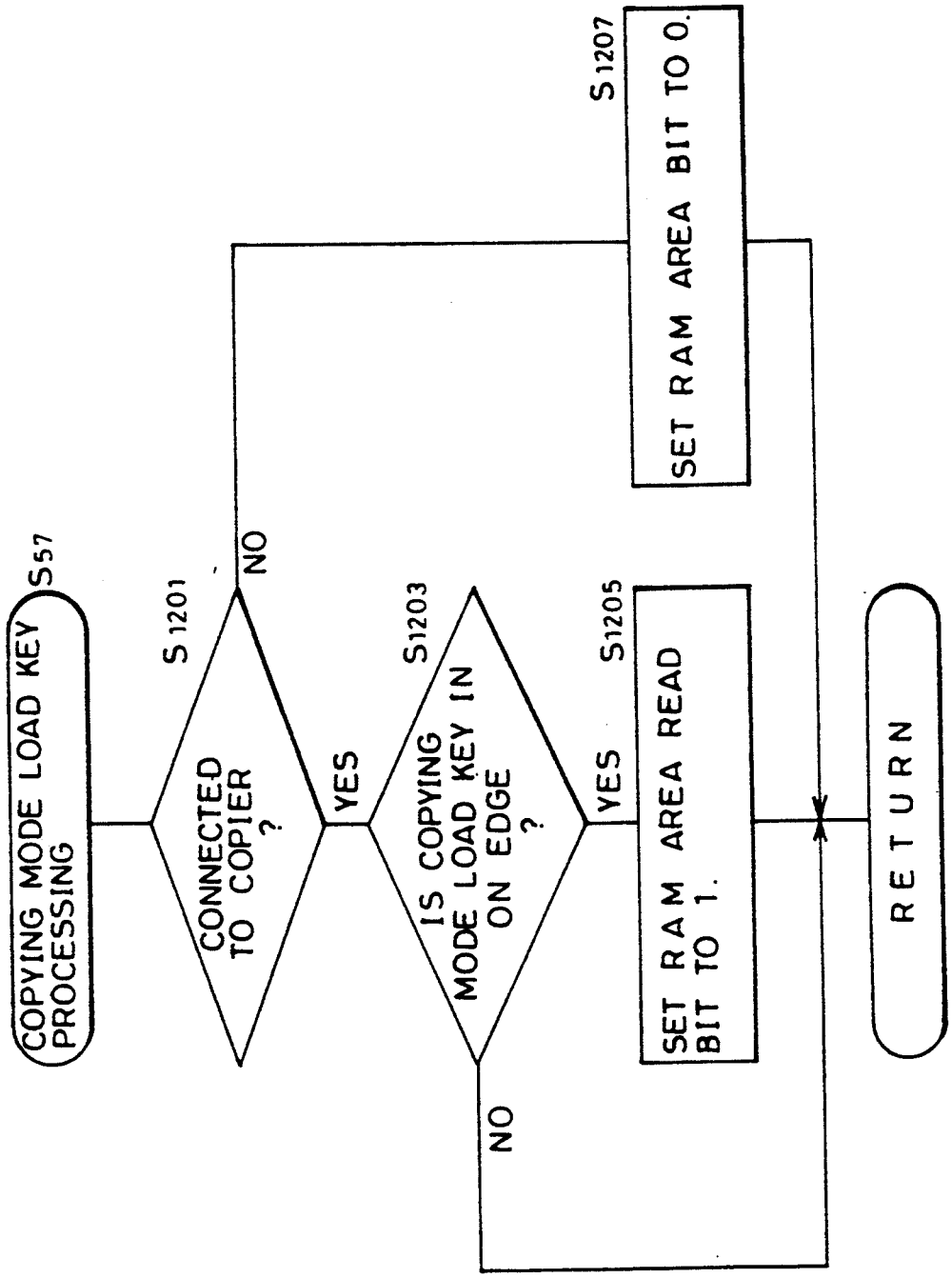
FIG. 25 is a flow chart showing the detailed contents of a copying mode load key processing of FIG. 23.

FIG. 25 is a flow chart showing the copying mode load key processing of FIG. 23.

When an ON edge of copying mode load key 18 is detected (S1203; YES) in a state that IC card and copying apparatus are connected to each other (S1201; YES), a read bit of RAM 550 is set to 1 (S1205). This causes a copying mode based on data of the IC card to be set in the copying apparatus (see FIG. 15).

The read bit of RAM 550 is set to 0 (S1207) in a state that the IC card and copying apparatus are not connected to each other (S1201; NO).

(4) Copying mode memory key processing

FIGS. 26A and 26B are flow charts showing the copying mode memory key processing.

When an ON edge of copying mode memory key 17 is detected (S1301; YES), a write bit is set to 1 (S1307) on condition that the power-on bit is 1 (S1303; YES) and that the IC card and copying apparatus are connected (S1305; YES). This causes the data of copying mode set in operation panel 70 of the copying apparatus to be written in IC card 200 (see FIG. 16).

Meanwhile, in case where the IC card is not connected to the copying apparatus (S1305; NO) even when the power-on bit is 1 (S1303; YES) upon detection of the ON edge of copying mode memory key 17

(S1301; YES), a state is determined (S1309), so that the following processings are executed in accordance with the determined values thereof.

(4-i) The state=0

The state is set to 1 (S1311).

In addition, a numeric value (a value representing the number of copies) indicated on segment indicating devices 51 of indicator portion 50 is stored in an area of the number-of-copy data of RAM 550 (S1313).

Furthermore, the CPU indicates "E" by employing the left-end device out of segment indicating devices 51, reads data from an area of exposure level data of RAM 550 and then indicates an exposure level by employing the remaining segment indicating devices 51 of four digits (S1315). The "E" represents "exposure".

(4-ii) The state=1

The state is set to 2 (S1317).

A numeric value (a value of an exposure level) indicated on segment indicating devices 51 of indicator portion 50 is stored in the area of exposure level data of 550 (S1319).

Further, the CPU indicates "L" by employing the left-end device out of segment indicating devices 51, reads data from an area of magnification data of RAM 550 and then indicates a magnification value by employing the remaining segment indicating devices 51 of four digits (S1321). The "L" represents "large".

(4-iii) The state=2

The state is set to 3 (S1323).

A numeric value (a magnification value) indicated on segment indicating devices 51 of indicator portion 50 is stored in the area of magnification data of RAM 550 (S 325).

Further, the CPU indicates "P" by employing the left-end device out of segment indicating devices 51, reads data from an area of paper size code data of RAM 550 and then indicates paper size by employing the remaining segment indicating devices 51 of four digits (S1327). The "P" represents "paper".

(4-iv) The state=3

The state is set to 4 (S1329).

Data (paper size) indicated on segment indicating devices 51 of indicator portion 50 is stored in the area of paper size code data of RAM 550 (S1331).

In addition, the CPU indicates "C" by employing the left end device out of segment indicating devices 51, reads data from an area of total number-of-copy data of RAM 550 and then indicates the total number of copies by employing the remaining segment indicating devices 51 of four digits (S1333). The "C" represents "copy".

(4-V) The state=4

The state is set to (S1335).

The CPU reads data from an area of number-of-copy data of RAM 550 and indicates the number of copies by segment indicating devices 51 of indicator portion 50. (S1337).

As in the foregoing manner, the indication/writing of each type of copying mode data is sequentially carried out in accordance with the value of the state (namely, the operation of copying mode memory key 17).

(5) Copying mode/calculating mode switching key processing

Figure 27:
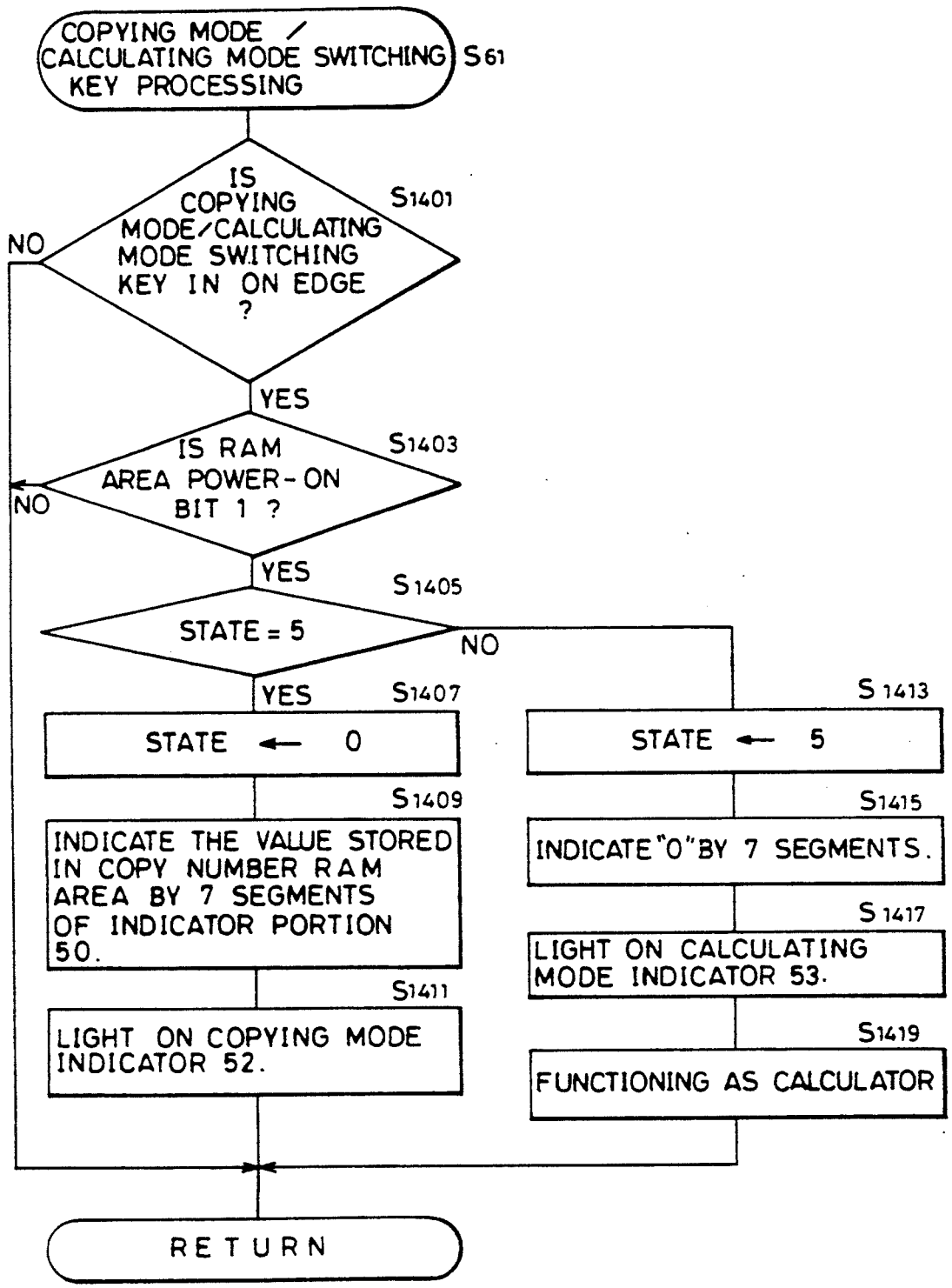
FIG. 27 is a flow chart showing the detailed contents of a copying mode/calculating mode switching key processing.

FIG. 27 is a flow chart showing the copying mode/calculating mode switching key processing.

When an ON edge of copying mode/calculating mode switching key 21 is detected (S1401; YES), a mode switching is carried out on condition that the power-on bit (see FIG. 10) is 1 (S1403).

That is, in case where the state is 5 (S1405; YES), a copying mode is set with the state being set to 0 (S1407).

In addition, the CPU reads data from the area of copy number data of RAM 550 and then indicates the number of copies by employing segment indicating devices 51 of indicator portion 50 (S1409).

Further, the CPU lights on copying mode indicator 52 of indicator portion 50 (S1411).

Meanwhile in case where the state is not 5 in step S1405 (S1405; NO), the state is set to 5 (S1413). The state=5 corresponds to the calculation mode.

An initial value 0 is also indicated by employing segment indicating devices 51 of indicator portion 50 (S1415).

The CPU lights on calculating mode indicator 53 of indicator portion 50 (S1417).

Further, the CPU sets an input queue state in the calculation mode (S1419).

(6) Interruption copying designating key processing

Figure 28:
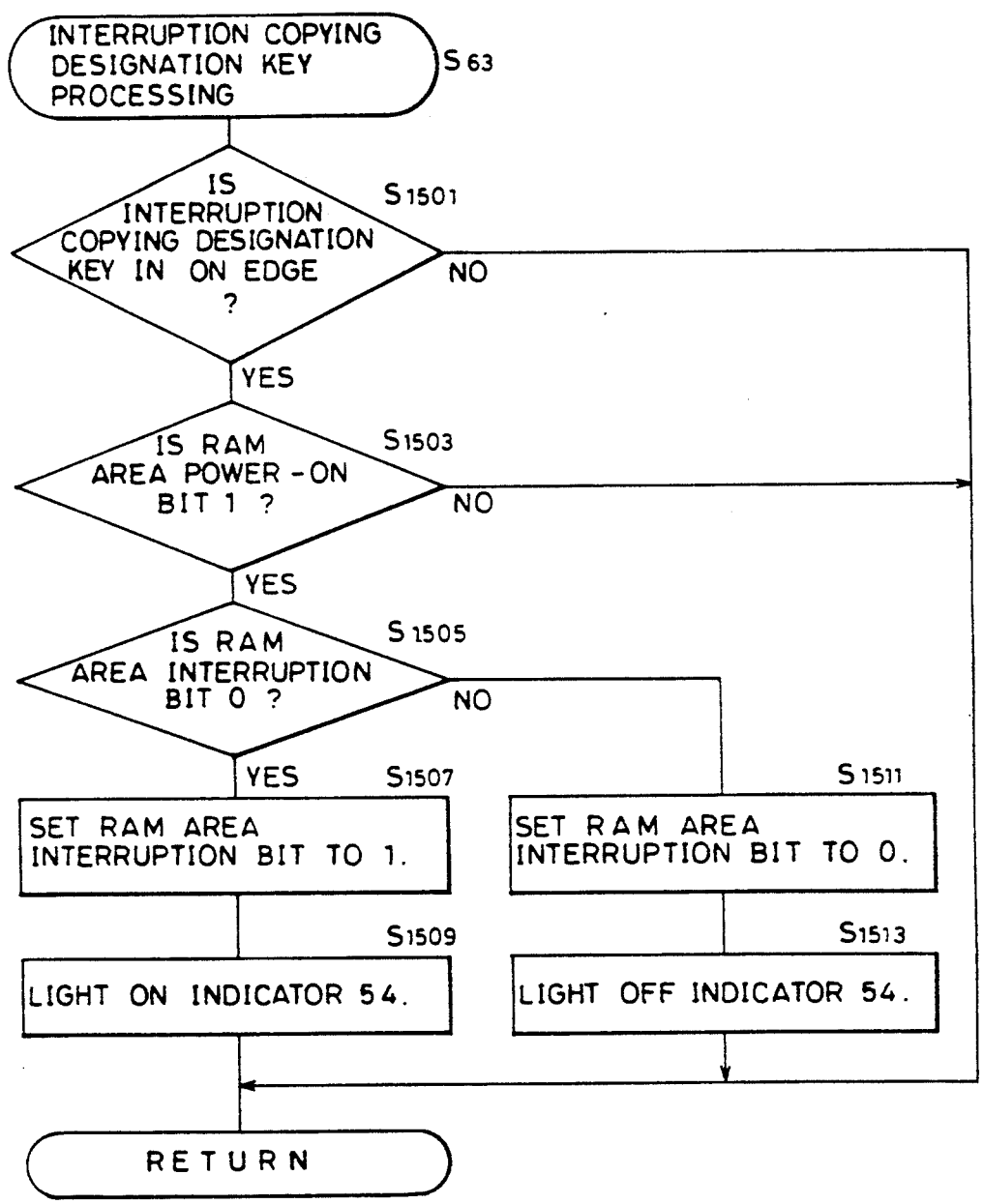
FIG. 28 is a flow chart showing the detailed contents of an interruption copying designating key processing of FIG. 23.

FIG. 28 is a flow chart showing an interruption copying designating key processing.

When the power-on bit is 1 (S1503; YES) in case of detecting an ON edge of interruption copying designation key 19 (S1501; YES), the CPU determines an interruption bit (see FIG. 10).

Consequently, if the interruption bit is 0 (S1505; YES), the CPU sets the interruption bit to 1 (S1507) to light on interruption indicator 54 of indicator portion 50 (S1509).

Meanwhile, if the interruption bit is 1 (S1505; NO), the CPU sets the interruption bit to 0 (S1511) to light off interruption indicator 54 of indicator portion 50 (S1513).

(7) Connection/disconnection of the IC card to/from the copying apparatus

Figure 29:
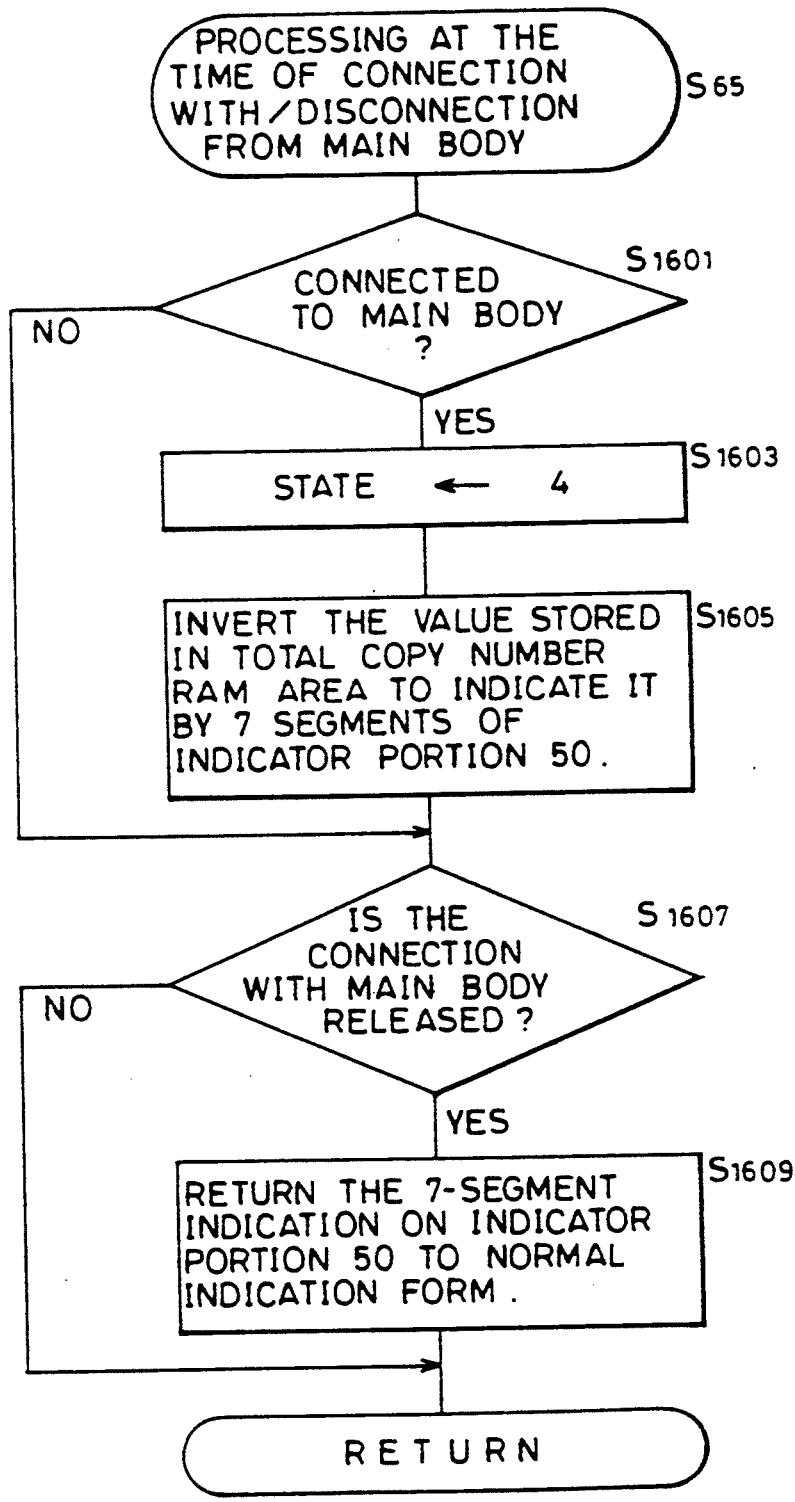
FIG. 29 is a flow chart showing the detailed contents upon connecting to and/or disconnecting from the main body of FIG. 23.

FIG. 29 is a flow chart showing a processing in case where the IC card is connected with/disconnected from the copying apparatus. This processing is executed when the connection of the IC card to the apparatus is in connection manner B.

When the IC card is connected to the copying apparatus (S1601; YES), the state is set to 4 (S1603). The state=4 represents a mode for indicating the data (total copy number count data) at address 10H-13H of RAM 550 on indicator portion 50, as seen from the above described step S1333.

The indication of the total copy number count data is inverted in both horizontal and vertical directions (S1605; see FIGS. 12A and 12B).

Meanwhile, when the connection of IC card and copying apparatus is released (S1607; YES), the indication of segment indicating devices 51 of indicator portion 50 is restored to the normal indication manner (S1609).

The control in the system of this embodiment is carried out in the foregoing described manner.

As has been described in detail in the embodiment, in the copying system of the present invention or in the storage medium device employed in this copying system, the interruption mode input means is provided in the storage medium device so as to perform the registration/erasing of interruption mode data.

This makes it possible to carry out the registration/erasing of interruption mode data in case of connecting the IC card to the copying apparatus, thereby make a flexible handling depending upon circumstances.

Moreover, the provision of the interruption mode input means in the storage medium device renders the method of setting the interruption mode more apparent to the user, resulting in improvements in usage of the image forming apparatus.

As shown in the above described embodiment, if the exposed operation keys are the four-arithmetic operation keys, the four arithmetic operations are enabled by employing these exposed operation keys. It is also possible to use an arbitrary combination of the operation keys of the copying apparatus and the exposed keys of the IC card.

Thus, even a key which is not provided in the copying apparatus (or provided as a variable key requiring time for use) but provided in the IC card becomes available for use by connecting the IC card to the apparatus the key, and hence becomes further available for the various applications.

Moreover, while the above described embodiment has shown the case where the group of four-arithmetic operation keys 12–16, copying mode memory key 17, copying mode load key 18 and power source ON/OFF key 20 are exposed (connection manner A; FIG. 7), the present invention is not limited to such a case. That is, variations of the mechanism of connection means also make it possible to connect the IC card and the copying apparatus with all of the operation keys shown in FIG. 1 being exposed.

In addition, the state of the key switch means for rendering the image processing means operative in the above described embodiment may be set in both the ON state and OFF state.

The non-operative state which is an opposite concept to the operative state means, for example, the power source OFF state or power-saving state of the image processing means.

Such a structure as described above makes it possible to set the image processing means in a desired state (the operative state or non-operative state) by a simple operation of connecting the storage medium means to the image processing means.

Furthermore, measures corresponding to the objects of connection is possible for loading the data of the storage medium means, charging the storage medium means or the like.

The indication on the storage medium means such as the IC card in the above described embodiment may be, for example, an indication of an image processing mode by abbreviations or the like without being limited to the accumulating total number of copies.

In addition, the storage medium means may include a key counter function (which enables the operation of the image processing means by the connection of the storage medium means and also enables the counting of the number of image forming processes during the connection of the storage medium means) so as to indicate the accumulating total number of copies when the storage medium means is used.

Moreover, the indication control means according to the above described embodiment allows the indication of the accumulating total number data of the storage medium means during the connection of the storage medium means. The accumulating total number data of the image processing means may be indicated when the storage medium means is not connected.

In the above described manner, the data of the accumulating total number of copies processed by employing the IC card can be obtained without connecting the IC card to the data input apparatus.

Furthermore, the indication of data (registered data and data which is currently inputted) according to the above described embodiment may be carried out according to the type of the data.

Also, the calculation device (or the IC card also having a calculator function) in the above described embodiment may include keying means for inverting an indication manner in a vertical direction so as to achieve the inverted indication of data by operating the keying means.

Moreover, the result of arithmetic operation in the above described embodiment may be indicated, for example, on the indicator means provided in the storage medium device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus comprising:
    a main body including image forming means for forming an image;
    a detachable member being detachable from said main body and including an arithmetic operation key for inputting a specific numerical calculation expression;
    connection means for connecting said detachable member to said main body with said arithmetic operation key being exposed to be operable; and
    arithmetic operation means, when said detachable member is being connected to said main body, for carrying out a numerical calculation in accordance with the operation of said arithmetic operation key.

2. The image forming apparatus according to claim 1, wherein
    said arithmetic operation key serves to designate division.

3. The image forming apparatus according to claim 2, further comprising
    control means for controlling said image forming means based on a result of the numerical calculation carried out by said arithmetic operation means.

4. The image forming apparatus according to claim 3, wherein
    said control means controls said image forming means so that the result of numerical calculation carried out by said arithmetic operation means is used for an image forming magnification.

5. The image forming apparatus according to claim 1, wherein
    said main body has a numerical input key for inputting a numerical value, and said arithmetic operation means performs numerical calculation according to the operations of said arithmetic operation key and said numerical input key.

6. An image forming apparatus comprising:
    a main body including image forming means for forming an image;
    a storage medium device detachable from said main body;
    switching means for switching a state of said storage medium device between a first state and a second state;
    determining in means for determining whether the state of said storage medium device is the first state or the second state when said storage medium device is attached to said main body; and control means for setting said image forming means in an operable state and in an inoperable state, said control means, when said storage medium device is attached to said main body, switching a state of said image forming means from said inoperable state to said operable state based on a result of determination by said determining means.

7. The image forming apparatus according to claim 6 wherein said inoperable state is a power saving state in which power consumption is lower than that of said operable state.

8. The image forming apparatus according to claim 6, wherein said inoperable state is a state in which power supply to said imaging forming means is stopped.

9. The image forming apparatus according to claim 6, wherein said switching means comprises key means provided on said storage medium device.

10. The image forming apparatus according to claim 9, wherein said key means includes a power source key for turning ON/OFF a power source of said storage medium device.

11. An image forming apparatus comprising:

a main body including paper feeding means for feeding a sheet of paper and image forming means for forming an image on the sheet fed by said paper feeding means;

counting means provided in said main body for counting an accumulating total number of image forming processes carried out by said image forming means;

storing means provided in said main body for storing the accumulating total number counted by said counting means; and a detachable member being detachable from said main body and including indication means for indicating an arbitrary value and control means for controlling said indication means to indicate the accumulating total number stored in said storing means.

12. The image forming apparatus according to claim 11, wherein said detachable member includes second storing means for storing a number of image forming processes carried out by said image forming means when said detachable member is attached to said main body; and said control means causes said indication means to indicate said number of image forming processes stored in said second storing means.

13. The image forming apparatus according to claim 11, wherein said detachable member includes determining means for determining whether or not said detachable member is attached to said main body; and said control means causes said indication means to indicate said accumulating total number stored in said storing means when said determining means determines that said detachable member is attached to said main body.

14. The image forming apparatus according to claim 11, wherein said detachable member includes storage means for storing data to be supplied to said main body when said detachable member is attached to said main body; and said control means causes said indication means to indicate the data stored in said storage means when said detachable member is not attached to said main body and to indicate said accumulating total number stored in said storing means when said detachable member is attached to said main body.

15. The image forming apparatus according to claim 14, wherein the data stored in said storage means is used for designating an operation mode of said image forming means.

16. An image forming apparatus comprising:

a main body including image forming means for forming an image, counting means for counting a number of image forming processes carried out by said image forming means, and storage means for storing said number of said image forming processes counted by said counting means;

a detachable member being detachable from said main body and including numerical value indicating means for indicating a numerical value; and control means for causing said numerical value indicating means to indicate the number of image forming processes stored in said storage means.

17. The image forming apparatus according to claim 16, further comprising:

said counting means for counting a number of image forming processes when said detachable member is being attached to said main body; and second storage means for storing the number of image forming processes counted by said second counting means, wherein said control means causes said numerical value indicating means to selectively indicate one of the number of image forming processes stored in said storage means and the number of image forming processes stored in said second storage means.

18. An image forming apparatus comprising:

a main body including image forming means for forming an image, counting means for counting a number of image forming processes carried out by said image forming means, storage means for storing said number of image forming processes counted by said counting means, and first numerical value indicating means for indicating a numerical value;

a detachable member being detachable from said main body and including second numerical value indicating means; and control means for causing said first numerical value indicating means to indicate said number of image forming processes when said detachable member is not attached to said main body, and for causing said second numerical value indicating means to indicate said number of image forming processes when said detachable member is attached to said main body.

19. An image forming apparatus comprising:

a main body including image forming means for forming an image, counting means for counting a number of image forming processes carried out by said image forming means, storage means for storing said number of image forming processes counted by said counting means, and first numerical value indicating means for indicating a numerical value;

a detachable member being detachable from said main body and including second numerical value indicating means for indicating a numerical value;

key means to be manually operated by an operator;

detecting means for detecting whether or not said detachable member is attached to said main body; and control means responsive to said key means and detecting means for causing said first numerical value indicating means to indicate said number of image forming processes in response to operation of said key means when said detachable member is not attached to said main body, and for causing said second numerical value indicating means to indicate said number of image forming processes in response to operation of said key means when said detachable member is attached to said main body.

20. An image forming apparatus comprising:

a main body including image forming means for forming an image;

a storage medium device being detachable from said main body and including a numerical value input key for inputting a numerical value, an arithmetic operation key for inputting the type of an arithmetic operation, arithmetic operation means for performing an arithmetic operation processing in response to inputs provided by said numerical value input key and said arithmetic operation key and storage means for storing a result of the arithmetic operation carried out by said arithmetic operation means; and control means for controlling said image forming means based on the result of the arithmetic operation stored in said storage means when said storage medium device is attached to said main body.

21. The image forming apparatus according to claim 20, wherein
said arithmetic operation key is a key for designating division.

22. The image forming apparatus according to claim 20, wherein
said control means controls said image forming means so that the result of the arithmetic operation stored in said storage means is used for an image forming magnification.

23. An image forming apparatus comprising:

a main body including image forming means for forming an image;

said indication means provided in said main body for indicating information;

operating means provided in said main body to be operated by an operator;

control means for causing said first indication means to indicate predetermined information based on an operation of said operating means; and a detachable member being detachable from said main body and including second indication means for indicating information wherein said control means causes said second indication means to indicate said predetermined information based on an operation of said operating means when said detachable member is being attached to said main body.

* * * * *